US011560392B2

(12) United States Patent
Amann et al.

(10) Patent No.: US 11,560,392 B2
(45) Date of Patent: Jan. 24, 2023

(54) BORON-CONTAINING COMPOUNDS

(71) Applicant: VENATORX PHARMACEUTICALS, INC., Malvern, PA (US)

(72) Inventors: Franz Amann, Hunzenschwil (CH); Matthew M. Bio, Cambridge, MA (US); Jonas Bürgler, Hunzenschwil (CH); Yuanqing Fang, Cambridge, MA (US); David Ford, Cambridge, MA (US); Daniel McGarry, Malvern, PA (US)

(73) Assignee: VENATORX PHARMACEUTICALS, INC., Malvern, PA (US)

( * ) Notice: Subject to any disclaimer, the term of this patent is extended or adjusted under 35 U.S.C. 154(b) by 0 days.

(21) Appl. No.: 17/115,514

(22) Filed: Dec. 8, 2020

(65) Prior Publication Data

US 2021/0163506 A1  Jun. 3, 2021

Related U.S. Application Data

(62) Division of application No. 16/322,372, filed as application No. PCT/US2017/045347 on Aug. 3, 2017, now Pat. No. 10,889,600.

(60) Provisional application No. 62/370,917, filed on Aug. 4, 2016.

(51) Int. Cl.
*C07F 5/02* (2006.01)
(52) U.S. Cl.
CPC .................. *C07F 5/025* (2013.01)
(58) Field of Classification Search
CPC ........................................ C07F 5/025
See application file for complete search history.

(56) References Cited

U.S. PATENT DOCUMENTS

| 4,427,690 | A | 1/1984 | Cole et al. |
|---|---|---|---|
| 7,271,186 | B1 | 9/2007 | Shoichet et al. |
| 7,714,159 | B2 | 5/2010 | Pickersgill et al. |
| 8,283,467 | B2 | 10/2012 | Ammoscato et al. |
| 8,680,136 | B2 | 3/2014 | Hirst et al. |
| 8,912,169 | B2 | 12/2014 | Burns et al. |
| 9,040,504 | B2 | 5/2015 | Burns et al. |
| 9,101,638 | B2 | 8/2015 | Reddy et al. |
| 9,376,454 | B2 | 6/2016 | Burns et al. |
| 9,403,850 | B2 | 8/2016 | Burns et al. |
| 9,422,314 | B2 | 8/2016 | Burns et al. |
| 9,511,142 | B2 | 12/2016 | Burns et al. |
| 9,637,504 | B2 | 5/2017 | Burns et al. |
| 9,642,869 | B2 | 5/2017 | Reddy et al. |
| 9,771,382 | B2 | 9/2017 | Burns et al. |
| 9,783,555 | B2 | 10/2017 | Burns et al. |
| 9,802,966 | B2 | 10/2017 | Burns et al. |
| 9,828,391 | B2 | 11/2017 | Burns et al. |
| 9,926,336 | B2 | 3/2018 | Burns et al. |
| 9,944,658 | B2 | 4/2018 | Burns et al. |
| 9,963,467 | B2 | 5/2018 | Reddy et al. |
| 10,125,152 | B2 | 11/2018 | Burns et al. |
| 10,206,937 | B2 | 2/2019 | Reddy et al. |
| 10,214,547 | B2 | 2/2019 | Burns et al. |
| 10,294,247 | B2 | 5/2019 | Burns et al. |
| 10,294,248 | B2 | 5/2019 | Burns et al. |
| 10,399,996 | B2 | 9/2019 | Burns et al. |
| 10,464,952 | B2 | 11/2019 | Burns et al. |
| 10,479,805 | B2 | 11/2019 | Wu et al. |
| 10,669,290 | B2 | 6/2020 | Burns et al. |
| 10,889,600 | B2 | 1/2021 | Amann et al. |
| 2010/0056478 | A1 | 3/2010 | Desarbre et al. |
| 2010/0120715 | A1 | 5/2010 | Burns et al. |
| 2010/0286092 | A1 | 11/2010 | Burns et al. |
| 2010/0292185 | A1 | 11/2010 | Burns et al. |
| 2010/0317621 | A1 | 12/2010 | Burns et al. |
| 2011/0294777 | A1 | 12/2011 | Blizzard et al. |
| 2012/0040932 | A1 | 2/2012 | Hirst et al. |
| 2014/0171390 | A1 | 6/2014 | Burns et al. |
| 2015/0094472 | A1 | 4/2015 | Hecker et al. |
| 2015/0361107 | A1 | 12/2015 | Trout |
| 2015/0361108 | A1 | 12/2015 | Burns et al. |
| 2017/0145037 | A1 | 5/2017 | Burns et al. |
| 2020/0010485 | A1 | 1/2020 | Burns et al. |
| 2020/0055877 | A1 | 2/2020 | Burns et al. |
| 2020/0317698 | A1 | 10/2020 | Burns et al. |
| 2020/0361962 | A1 | 11/2020 | Burns et al. |
| 2022/0002322 | A1 | 1/2022 | Burns et al. |

FOREIGN PATENT DOCUMENTS

| CN | 1965838 A | 5/2007 |
|---|---|---|
| CN | 105801610 A | 7/2016 |
| RU | 2012107163 A | 9/2013 |
| WO | WO-2005004799 A2 | 1/2005 |
| WO | WO-2005097809 A2 | 10/2005 |
| WO | WO-2009064413 A1 | 5/2009 |
| WO | WO-2009064414 A1 | 5/2009 |
| WO | WO-2010056827 A1 | 5/2010 |

(Continued)

OTHER PUBLICATIONS

Burns et al (2014): STN International CAPLUS database, (Columbus, Ohio), Accession No. 2014: 955904.*

Eidam et al. Design, synthesis, crystal structures, and antimicrobial activity of sulfonamide boronic acids as β-lactamase inhibitors. J. Med. Chem. 53(21):7852-7863 (2010).

Martin et al. Rational design and synthesis of a highly effective transition state analog inhibitor of the RTEM-1 β-lactamase. Tetrahedron Lett. 36:8399-8402 (1995).

Matteson. Boronic esters in asymmetric synthesis. J Org Chem 78:10009-10023 (2013).

Matteson et al. Synthesis of 1-amino-2-phenylethane-1-boronic acid derivatives. Organometallics 3:614-18 (1984).

(Continued)

*Primary Examiner* — Golam M Shameem

(74) *Attorney, Agent, or Firm* — Wilson Sonsini Goodrich & Rosati

(57) ABSTRACT

Described herein are boron-containing compounds, compositions, and methods for their preparation.

1 Claim, 4 Drawing Sheets

(56) References Cited

FOREIGN PATENT DOCUMENTS

| WO | WO-2010130708 A1 | 11/2010 |
|---|---|---|
| WO | WO-2012021455 A1 | 2/2012 |
| WO | WO-2013014497 A1 | 1/2013 |
| WO | WO-2013053372 A1 | 4/2013 |
| WO | WO-2013122888 A2 | 8/2013 |
| WO | WO-2014086664 A1 | 6/2014 |
| WO | WO-2014089365 A1 | 6/2014 |
| WO | WO-2014107535 A1 | 7/2014 |
| WO | WO-2014107536 A1 | 7/2014 |
| WO | WO-2014110442 A1 | 7/2014 |
| WO | WO-2014151958 A1 | 9/2014 |
| WO | WO-2015157618 A1 | 10/2015 |
| WO | WO-2015171398 A1 | 11/2015 |
| WO | WO-2015171430 A1 | 11/2015 |
| WO | WO-2015179308 A1 | 11/2015 |
| WO | WO-2015191907 A1 | 12/2015 |
| WO | WO-2016003929 A1 | 1/2016 |
| WO | WO-2016100043 A1 | 6/2016 |
| WO | WO-2017044828 A1 | 3/2017 |
| WO | WO-2017100537 A1 | 6/2017 |
| WO | WO-2018027062 A1 | 2/2018 |
| WO | WO-2018165048 A1 | 9/2018 |
| WO | WO-2018218154 A1 | 11/2018 |
| WO | WO-2018218190 A1 | 11/2018 |
| WO | WO-2020112542 A1 | 6/2020 |

OTHER PUBLICATIONS

Morandi et al. Structure-based optimization of cephalothin-analogue boronic acids as β-lactamase inhibitors. Bioorg. Med. Chem. 16(3):1195-1205 (2008) (Epub: Nov. 7, 2007).
Ness et al. Structure-based design guides the improved efficacy of deacylation transition state analogue inhibitors of TEM-1 β-lactamase. Biochemistry 39(18):5312-5321 (2000).
PCT/US2013/073428 International Search Report and Written Opinion dated Apr. 25, 2014.
PCT/US2014/011144 International Search Report and Written Opinion dated May 12, 2014.
PCT/US2014/026727 International Search Report and Written Opinion dated Jul. 25, 2014.
PCT/US2015/035407 International Search Report and Written Opinion dated Oct. 20, 2015.
PCT/US2016/051076 International Search Report and Written Opinion dated Jan. 17, 2017.
PCT/US2016/065771 International Search Report and Written Opinion dated Apr. 21, 2017.
PCT/US2017/045347 International Search Report and Written Opinion dated Nov. 8, 2017.
PCT/US2018/020968 International Search Report and Written Opinion dated Jun. 29, 2018.
Powers et al. Structure-based approach for binding site identification on AmpC β-lactamase. J. Med. Chem. 45(15):3222-3234 (2002).
Powers et al. Structures of ceftazidime and its transition-state analogue in complex with AmpC β-lactamase: implications for resistance mutations and inhibitor design. Biochemistry 40(31):9207-9214 (2001).
Pub Chem Substance Record for SID 197433672. https://pubchem.ncbi.nim.nih/substance/197433672. Created Aug. 18, 2014. Retrieved Jan. 10, 2017 (5 pgs).
U.S. Appl. No. 14/152,916 Office Action dated Aug. 29, 2014.
U.S. Appl. No. 14/649,527 Office Action dated Nov. 9, 2015.
U.S. Appl. No. 14/693,318 Office Action dated Sep. 1, 2015.
U.S. Appl. No. 14/759,853 Office Action dated Dec. 11, 2015.
U.S. Appl. No. 14/773,717 Office Action dated Feb. 27, 2017.
U.S. Appl. No. 14/773,717 Office Action dated Jun. 8, 2017.
U.S. Appl. No. 15/162,395 Office Action dated Oct. 5, 2016.
U.S. Appl. No. 15/194,433 Office Action dated Feb. 9, 2017.
U.S. Appl. No. 15/212,959 Office Action dated Mar. 23, 2017.
U.S. Appl. No. 15/261,359 Office Action dated Feb. 1, 2018.
U.S. Appl. No. 15/261,359 Office Action dated Jan. 9, 2019.
U.S. Appl. No. 15/261,359 Office Action dated Jul. 13, 2017.
U.S. Appl. No. 15/261,359 Office Action dated Jul. 13, 2018.
U.S. Appl. No. 15/366,769 Office Action dated Oct. 24, 2017.
U.S. Appl. No. 15/675,253 Office Action dated Oct. 4, 2017.
U.S. Appl. No. 15/675,262 Office Action dated Jan. 24, 2018.
U.S. Appl. No. 15/675,262 Office Action dated Sep. 18, 2017.
U.S. Appl. No. 15/797,224 Office Action dated Aug. 13, 2018.
U.S. Appl. No. 15/922,376 Office Action dated Jul. 27, 2018.
U.S. Appl. No. 16/002,363 Office Action dated Dec. 14, 2018.
U.S. Appl. No. 16/238,363 Office Action dated Sep. 10, 2019.
U.S. Appl. No. 90/013,866 Ex Parte Reexam Office Action dated Apr. 20, 2017.
Watkins et al. Novel β-lactamase inhibitors: a therapeutic hope against the scourge of multidrug resistance. ©Dec. 24, 2013. Accessed Jul. 7, 2018. (18 pgs) (2013).
Weston et al. Structure-based enhancement of boronic acid-based inhibitors of AmpC β-lactamase. J. Med. Chem. 41(23):4577-4586 (1998).
Zhou et al. Trigonelline: A Plant Alkaloid With Therapeutic Potential for Diabetes and Central Nervous System Disease. Curr Med Chem 19(21):3523-3531 (2012).
U.S. Appl. No. 16/491,116 Office Action dated Mar. 25, 2021.
U.S. Appl. No. 16/864,634 Office Action dated Apr. 1, 2021.
U.S. Appl. No. 16/864,634 Office Action dated Oct. 7, 2021.
Byrn et al. Pharmaceutical Solids: A Strategic Approach to Regulatory Considerations. Pharm Res 12(7):945-954 (1995).
Guillory. Chapter 5: Generation of Polymorphs, Hydrates, Solvates, and Amorphous Solids. Polymorphism in Pharmaceutical Solids pp. 183-226 (Brittain, H.G., ed., 1999).
Higgins et al. In Vitro Activities of the -Lactamase Inhibitors Clavulanic Acid, Sulbactam, and Tazobactam Alone or in Combination with -Lactams against Epidemiologically Characterized Multidrug-Resistant Acinetobacter baumannii Strains. Antimicron Agents Chemother 48(5):1586-1592 (2004).
Shah et al. Chapter 2: Approaches for Improving Bioavailability of Poorly Soluble Drugs. Pharmaceutical Dosage Forms: Tablets. 3rd edition, vol. 2, chapter 2 (Augsburger et al. editors), p. 62-66 (Dec. 31, 2008).
The Chemical Society of Japan (ed.), The Fourth Edition of Lecture Notes in Experimental Chemistry 1: Basic Operations I, pp. 184-189, Published by Maruzen Co., Apr. 5, 1996.

\* cited by examiner

BORON-CONTAINING COMPOUNDS

CROSS-REFERENCE

This application is a divisional of Ser. No. 16/322,372, filed Jan. 31, 2019, which is a U.S. National Stage entry of International Application No. PCT/US 2017/045347, filed Aug. 3, 2017, which claims the benefit of U.S. Application Ser. No. 62/370,917, filed Aug. 4, 2016, all of which are incorporated by reference in their entirety.

STATEMENT AS TO FEDERALLY SPONSORED RESEARCH

This invention was made with the support of the United States government under Contract number HHSN272201300019C (Title: Development of Therapeutic Medical Countermeasures for Biodefense and Emerging Infectious Diseases) by the National Institutes of Health (NIH). The government has certain rights in the invention.

BACKGROUND OF THE INVENTION

The present invention relates to boron-containing compounds, and methods for their preparation. Said compounds and pharmaceutical compositions comprising said compounds are useful as inhibitors of beta-lactamase enzymes and as antibacterial agents.

SUMMARY OF THE INVENTION

Disclosed herein is a continuous flow process for making a compound of Formula (III):

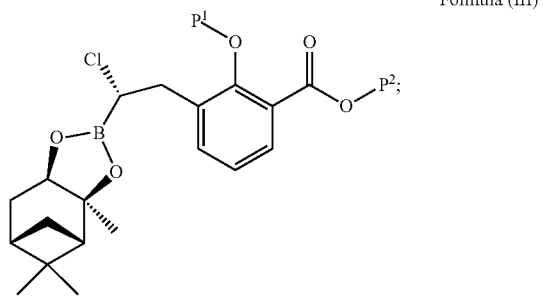

Formula (III)

wherein
$P^1$ is a hydroxyl protecting group; and
$P^2$ is a carboxyl protecting group;
the process comprising:
(a) providing a first continuous flow of a compound of Formula (II) and dichloromethane:

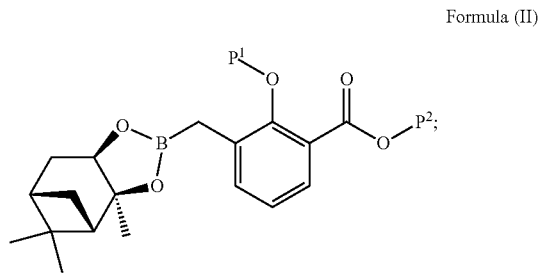

Formula (II)

(b) providing a second continuous flow of a base selected from lithium diisopropylamide and 2,2,6,6-tetramethylpiperidinylmagnesium chloride:lithium chloride;
(c) mixing the first continuous flow and the second continuous flow in a mixing chamber to yield a third continuous flow comprising a first reactive intermediate;
(d) collecting the first reactive intermediate into a collection vessel at the output of the third continuous flow;
(e) treating the first reactive intermediate with a Lewis acid; and
(f) warming the collection vessel to provide the compound of Formula (III).

In some embodiments of a continuous flow process for making a compound of Formula (III), the first reactive intermediate is collected into a collection vessel that does not have continuous outflow. In some embodiments of a continuous flow process for making a compound of Formula (III), the first continuous flow further comprises a coordinating ethereal solvent. In some embodiments of a continuous flow process for making a compound of Formula (III), the second continuous flow further comprises a coordinating ethereal solvent. In some embodiments of a continuous flow process for making a compound of Formula (III), the second continuous flow further comprises heptane, ethyl benzene, or a combination thereof. In some embodiments of a continuous flow process for making a compound of Formula (III), the Lewis acid is provided as a fourth continuous flow further comprising a coordinating ethereal solvent. In some embodiments of a continuous flow process for making a compound of Formula (III), the water content of the coordinating ethereal solvent is less than about 0.08% (w/w). In some embodiments of a continuous flow process for making a compound of Formula (III), the water content of the coordinating ethereal solvent is less than about 0.05% (w/w). In some embodiments of a continuous flow process for making a compound of Formula (III), the coordinating ethereal solvent is substantially free of water. In some embodiments of a continuous flow process for making a compound of Formula (III), the dichloromethane is substantially free of water. In some embodiments of a continuous flow process for making a compound of Formula (III), the base is substantially free of water. In some embodiments of a continuous flow process for making a compound of Formula (III), the heptane, ethyl benzene, or a combination thereof is substantially free of water. In some embodiments of a continuous flow process for making a compound of Formula (III), the process comprises pre-cooling the first continuous flow to a temperature in the range of about −40° C. to about −10° C. In some embodiments of a continuous flow process for making a compound of Formula (III), the process comprises pre-cooling the second continuous flow to a temperature in the range of about −40° C. to about −10° C. In some embodiments of a continuous flow process for making a compound of Formula (III), the temperature of the mixing chamber is not controlled. In some embodiments of a continuous flow process for making a compound of Formula (III), the mixing in the mixing chamber is performed over about 50 milliseconds to about 500 milliseconds. In some embodiments of a continuous flow process for making a compound of Formula (III), the mixing in the mixing chamber is performed over about 50 milliseconds to about 200 milliseconds. In some embodiments of a continuous flow process for making a compound of Formula (III), the mixing in the mixing chamber is performed over less than about 200 milliseconds. In some embodiments of a continuous flow process for making a compound of Formula (III), the third continuous flow has a temperature in the range of about −20° C. to about +10° C. In some embodiments of a continuous flow process for making a compound of Formula (III), the process comprises maintaining the collection vessel at the output of the third continuous flow at a temperature in the range of about −10° C. to about +10° C. In some embodiments of a continuous flow process for making a compound of Formula (III), the collection vessel is warmed to room temperature in step (f). In some embodiments of a continuous flow process for making a compound of Formula (III), the molar ratio of the base to a compound of Formula (II) is in the range of about 1:1 to about 1.5:1. In some embodiments of a continuous flow process for making a compound of Formula (III), the molar ratio of the base to a compound of Formula (II) is in the range of about 1:1 to about 1.3:1. In some embodiments of a continuous flow process for making a compound of Formula (III), the molar ratio of the dichloromethane to a compound of Formula (II) is in the range of about 5:1 and 7:1. In some embodiments of a continuous flow process for making a compound of Formula (III), the molar ratio of the dichloromethane to a compound of Formula (II) is in the range of about 6:1 and 7:1. In some embodiments of a continuous flow process for making a compound of Formula (III), the molar ratio of the Lewis acid to a compound of Formula (II) is in the range of about 1:1 and 3:1. In some embodiments of a continuous flow process for making a compound of Formula (III), the process further comprises a workup. In some embodiments of a continuous flow process for making a compound of Formula (III), the workup comprises a buffered solution. In some embodiments of a continuous flow process for making a compound of Formula (III), the pH of the buffered solution is about 6. In some embodiments of a continuous flow process for making a compound of Formula (III), the buffered solution comprises a chelating agent. In some embodiments of a continuous flow process for making a compound of Formula (III), the buffered solution comprises citric acid, tartaric acid, EDTA, or a combination thereof. In some embodiments of a continuous flow process for making a compound of Formula (III), the base is lithium diisopropylamide. In some embodiments of a continuous flow process for making a compound of Formula (III), the Lewis acid is $ZnCl_2$. In some embodiments of a continuous flow process for making a compound of Formula (III), the coordinating ethereal solvent is 2-methyltetrahydrofuran. In some embodiments of a continuous flow process for making a compound of Formula (III), the compound of Formula (III) is obtained in about 90% to about 95% yield (mole %). In some embodiments of a continuous flow process for making a compound of Formula (III), the process further generates less than about 2% (mole %) of a compound of Formula (IV):

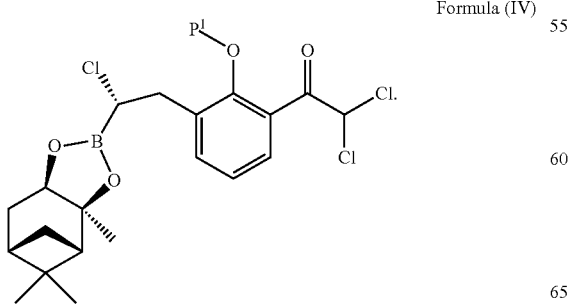

Formula (IV)

In some embodiments of a continuous flow process for making a compound of Formula (III), the process further generates less than about 2% (mole %) of a compound of Formula (V):

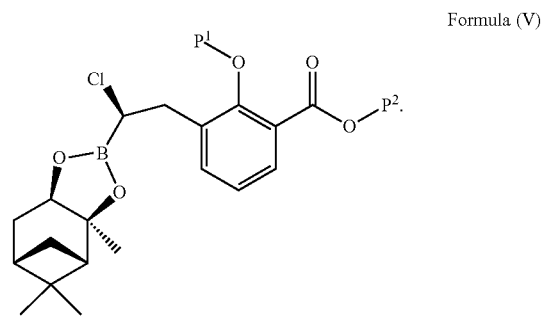

Formula (V)

In some embodiments of a continuous flow process for making a compound of Formula (III), $P^1$ is methyl. In some embodiments of a continuous flow process for making a compound of Formula (III), $P^2$ is tert-butyl.

Also disclosed herein is a continuous flow process for making a compound of Formula (II):

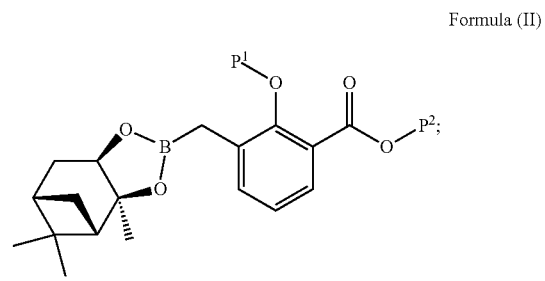

Formula (II)

wherein
$P^1$ is a hydroxyl protecting group; and
$P^2$ is a carboxyl protecting group;
the process comprising:
(a) providing a first continuous flow of a compound of Formula (I) and chloroiodomethane:

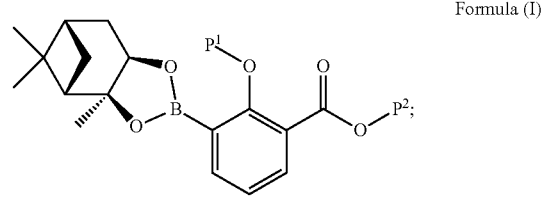

Formula (I)

(b) providing a second continuous flow of a hindered Grignard reagent selected from isopropylmagnesium chloride, isobutylmagnesium chloride, isopropylmagnesium chloride:lithium chloride, and isobutylmagnesium chloride:lithium chloride;
(c) mixing the first continuous flow and the second continuous flow in a mixing chamber to yield a third continuous flow comprising a first reactive intermediate;
(d) collecting the first reactive intermediate into a collection vessel at the output of the third continuous flow;

(e) warming the collection vessel to provide the compound of Formula (II).

In some embodiments of a continuous flow process for making a compound of Formula (II), the first reactive intermediate is collected into a collection vessel that does not have continuous outflow. In some embodiments of a continuous flow process for making a compound of Formula (II), the first continuous flow further comprises a coordinating ethereal solvent. In some embodiments of a continuous flow process for making a compound of Formula (II), the second continuous flow further comprises a coordinating ethereal solvent. In some embodiments of a continuous flow process for making a compound of Formula (II), the water content of the coordinating ethereal solvent is less than about 0.08% (w/w). In some embodiments of a continuous flow process for making a compound of Formula (II), the water content of the coordinating ethereal solvent is less than about 0.05% (w/w). In some embodiments of a continuous flow process for making a compound of Formula (II), the coordinating ethereal solvent is substantially free of water. In some embodiments of a continuous flow process for making a compound of Formula (II), the chloroiodomethane is substantially free of water. In some embodiments of a continuous flow process for making a compound of Formula (II), the hindered Grignard reagent is substantially free of water. In some embodiments of a continuous flow process for making a compound of Formula (II), the process comprises pre-cooling the first continuous flow to a temperature in the range of about −40° C. to about −0° C. In some embodiments of a continuous flow process for making a compound of Formula (II), the process comprises pre-cooling the second continuous flow to a temperature in the range of about −40° C. to about −0° C. In some embodiments of a continuous flow process for making a compound of Formula (II), the temperature of the mixing chamber is not controlled. In some embodiments of a continuous flow process for making a compound of Formula (II), the mixing in the mixing chamber is performed over about 500 milliseconds to about 1 second. In some embodiments of a continuous flow process for making a compound of Formula (II), the mixing in the mixing chamber is performed over about 700 milliseconds to about 1 second. In some embodiments of a continuous flow process for making a compound of Formula (II), the mixing in the mixing chamber is performed over less than about 1 second. In some embodiments of a continuous flow process for making a compound of Formula (II), the third continuous flow has a temperature in the range of about −20° C. to about +10° C. In some embodiments of a continuous flow process for making a compound of Formula (II), the process comprises maintaining the collection vessel at the output of the third continuous flow at a temperature in the range of about −10° C. to about +10° C. In some embodiments of a continuous flow process for making a compound of Formula (II), the collection vessel is warmed to room temperature in step (e). In some embodiments of a continuous flow process for making a compound of Formula (II), the molar ratio of the hindered Grignard reagent to a compound of Formula (I) is in the range of about 1:1 to about 2:1. In some embodiments of a continuous flow process for making a compound of Formula (II), the molar ratio of the hindered Grignard reagent to a compound of Formula (I) is in the range of about 1:1 to about 1.5:1. In some embodiments of a continuous flow process for making a compound of Formula (II), the molar ratio of the chloroiodomethane to a compound of Formula (I) is in the range of about 1:1 to about 2:1. In some embodiments of a continuous flow process for making a compound of Formula (II), the molar ratio of the chloroiodomethane to a compound of Formula (I) is in the range of about 1:1 to about 1.5:1. In some embodiments of a continuous flow process for making a compound of Formula (II), the hindered Grignard reagent is isopropylmagnesium chloride:lithium chloride. In some embodiments of a continuous flow process for making a compound of Formula (II), the coordinating ethereal solvent is tetrahydrofuran. In some embodiments of a continuous flow process for making a compound of Formula (II), the compound of Formula (II) is obtained in about 90% to about 99% yield (mole %). In some embodiments of a continuous flow process for making a compound of Formula (II), $P^1$ is methyl. In some embodiments of a continuous flow process for making a compound of Formula (II), $P^2$ is tert-butyl.

Also disclosed herein is a compound of Formula (A), or a pharmaceutically acceptable salt, solvate, or stereoisomer thereof:

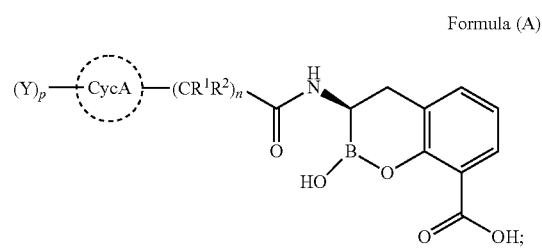

Formula (A)

wherein n is 0, 1, 2, or 3;

p is 1, 2, or 3;

CycA is an optionally substituted 3-10 membered cycloalkyl;

each Y is independently —$NR^4R^5$, —$NR^4C(=NR^5)NR^4R^5$, —$C(=NR^4)NR^4R^5$, —$N(R^4)C(=NR^5)R^6$, —$(CR^6R^7)_\nu NR^4R^5$, —$(CR^6R^7)_\nu N(R^4)C(=NR^5)NR^4R^5$, —$NR^4(CR^6R^7)_\nu NR^4R^5$, —$NR^4(CR^6R^7)_\nu OR^{10}$, —$(CR^6R^7)_\nu NR^4(CR^6R^7)_\nu NR^4R^5$, —$NR^5C(=NR^5)NR^4(CR^6R^7)_\nu NR^4R^5$, —$NR^4(CR^6R^7)_\nu N(R^4)C(=NR^5)NR^4R^5$, —$NR^5C(O)CR^6(NR^4R^5)(CR^6R^7)_\nu NR^4R^5$, —$(CR^6R^7)_\nu C(=NR^5)NR^4R^5$, —$(CR^6R^7)_\nu N(R^4)C(O)(CR^6R^7)_\nu NR^4R^5$, and —$O(CR^6R^7)_\nu NR^4R^5$;

each $R^1$ and $R^2$ are independently hydrogen, halogen, optionally substituted $C_1$-$C_6$ alkyl, optionally substituted $C_3$-$C_6$ cycloalkyl, —$OR^{10}$, —$SR^{10}$, or —$NR^4R^5$;

or $R^1$ and $R^2$ on the same carbon are taken together form an oxo, an optionally substituted oxime, an optionally substituted carbocycle, or optionally substituted heterocycle;

each $R^4$ and $R^5$ are independently hydrogen, —OH, —CN, optionally substituted $C_1$-$C_6$ alkyl, optionally substituted cycloalkyl, optionally substituted heterocycloalkyl, optionally substituted aryl, or optionally substituted heteroaryl;

or $R^4$ and $R^5$ are taken together with the nitrogen to which they are attached to form an optionally substituted heterocycloalkyl;

each $R^6$ and $R^7$ are independently hydrogen, halogen, optionally substituted $C_1$-$C_6$ alkyl, optionally substituted $C_3$-$C_6$ cycloalkyl, —$OR^{10}$, —$SR^{10}$, or —$NR^4R^5$;

or $R^6$ and $R^7$ on the same carbon are taken together form an oxo, an optionally substituted oxime, an optionally substituted carbocycle, or optionally substituted heterocycle;

$R^{10}$ is hydrogen, optionally substituted $C_1$-$C_6$ alkyl, or optionally substituted $C_3$-$C_6$ cycloalkyl; and
v is 1, 2, or 3;
made by a process comprising:
(a) reacting a compound of Formula (III):

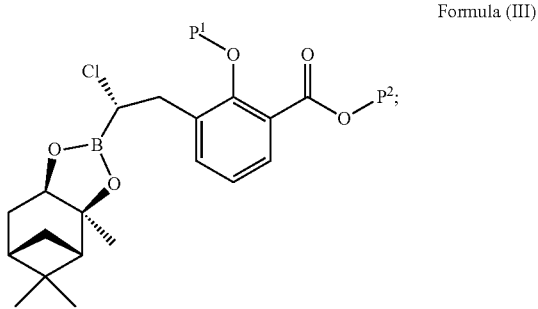

Formula (III)

wherein
$P^1$ is a hydroxyl protecting group; and
$P^2$ is a carboxyl protecting group;
with a protected ammonium reagent to form a compound of Formula (VI):

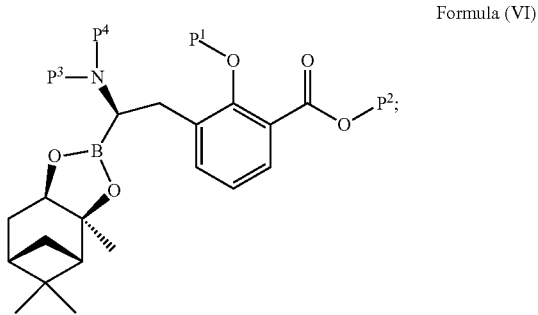

Formula (VI)

wherein $P^3$ and $P^4$ are amine protecting groups;
(b) reacting a compound of Formula (VI) with a compound of Formula (VII):

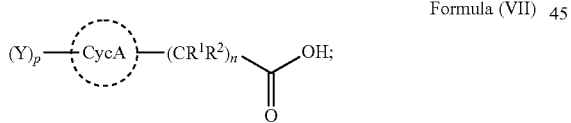

Formula (VII)

to form a compound of Formula (VIII):

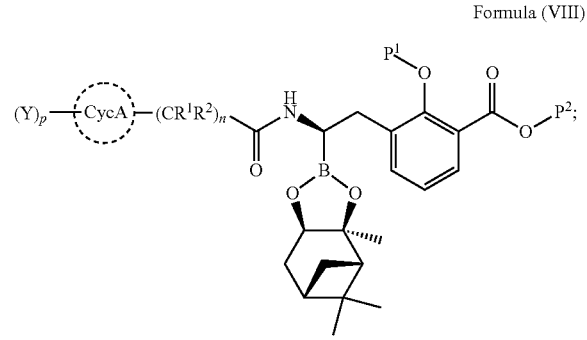

Formula (VIII)

(c) treating the compound of Formula (VIII) with an acid to obtain the compound of Formula (A).

In some embodiments, the protected ammonium reagent is a metal salt of hexaalkyldisilazane. In some embodiments, n is 1 or 2. In some embodiments, p is 1 or 2. In some embodiments, CycA is an optionally substituted cyclopentane or an optionally substituted cyclohexane. In some embodiments, each Y is independently —$NR^4R^5$ or —$NR^4$($CR^6R^7$)$_v$$NR^4R^5$. In some embodiments, v is 2 or 3. In some embodiments, $R^1$ and $R^2$ are hydrogen. In some embodiments, $R^4$ and $R^5$ are independently hydrogen or optionally substituted heteroaryl. In some embodiments, $R^6$ and $R^7$ are hydrogen. In some embodiments, $P^1$ is methyl. In some embodiments, $P^2$ is tert-butyl. In some embodiments, $P^3$ and $P^4$ are trimethylsilyl. In some embodiments, the process yields the compound of Formula (A) that is at least about 97% (mole %) pure. In some embodiments, the process further comprises step (d) crystallizing the compound of Formula (A). In some embodiments, the compound of Formula (A) is crystalline. In some embodiments, the compound of Formula (A) is free of trifluoroacetic acid. In some embodiments, the compound of Formula (A) is more than about 98% pure (mole %).

INCORPORATION BY REFERENCE

Figure 1:
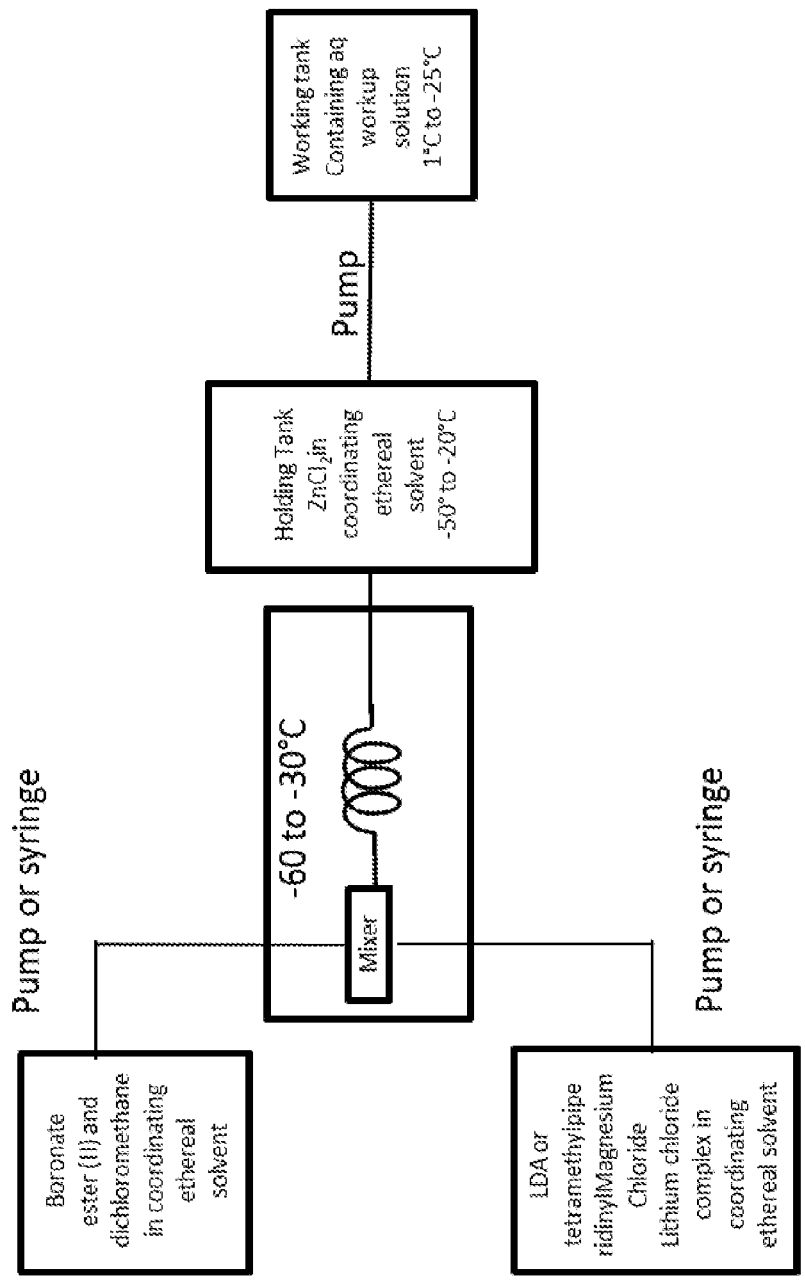
FIG. 1 shows the diagram for flow chemistry described herein.

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

Antibiotics are the most effective drugs for the clinical treatment of bacterial infections. They are in common use due to their advantages of good antibacterial effect with limited side effects. Among them, the beta-lactam class of antibiotics (for example, penicillins, cephalosporins, and carbapenems) is widely used because they have a strong bactericidal effect and low toxicity.

To counter the efficacy of the various beta-lactams antibiotics, bacteria have evolved to produce deactivating enzymes, called beta-lactamases, which act upon beta-lactam substrates. These beta-lactamases are categorized as "serine" or "metallo" based, respectively, on presence of a key serine or zinc in the enzyme active site. The rapid spread of this mechanism of bacterial resistance can severely limit beta-lactam treatment options in the hospital and in the community. To combat this type of resistant bacteria, inhibitors of beta-lactamase have been developed which restore the effectiveness of the beta-lactam class of antibiotics when administered in combination. Thus the discovery of new beta-lactamase inhibitors has become a focus of efforts for the discovery and development of new anti-bacterial therapies.

Good manufacturing practices are usually required for large scale manufacture of clinically useful drug candidates. Provided herein are certain processes and methods for the manufacture of new beta-lactamase inhibitors, or intermediates for the synthesis thereof.

Definitions

As used in the specification and appended claims, unless specified to the contrary, the following terms have the meaning indicated below.

As used herein and in the appended claims, the singular forms "a," "and," and "the" include plural referents unless the context clearly dictates otherwise.

When ranges are used herein for physical properties, such as molecular weight, or chemical properties, such as chemical formulae, all combinations and subcombinations of ranges and specific embodiments therein are intended to be included.

The term "about" when referring to a number or a numerical range means that the number or numerical range referred to is an approximation within experimental variability (or within statistical experimental error), and thus the number or numerical range varies between 1% and 15% of the stated number or numerical range.

The term "comprising" (and related terms such as "comprise" or "comprises" or "having" or "including") is not intended to exclude that which in other certain embodiments, for example, an embodiment of any composition of matter, composition, method, or process, or the like, described herein, "consist of" or "consist essentially of" the described features.

As used herein, "treatment" or "treating" or "palliating" or "ameliorating" are used interchangeably herein. These terms refers to an approach for obtaining beneficial or desired results including but not limited to therapeutic benefit and/or a prophylactic benefit. By "therapeutic benefit" is meant eradication or amelioration of the underlying disorder being treated. Also, a therapeutic benefit is achieved with the eradication or amelioration of one or more of the physiological symptoms associated with the underlying disorder such that an improvement is observed in the patient, notwithstanding that the patient is still afflicted with the underlying disorder. For prophylactic benefit, the compositions are administered to a patient at risk of developing a particular disease, or to a patient reporting one or more of the physiological symptoms of a disease, even though a diagnosis of this disease has been made.

As used herein, "room temperature" means 25±5° C. In some embodiments, room temperature is 20° C. In some embodiments, room temperature is 21° C. In some embodiments, room temperature is 22° C. In some embodiments, room temperature is 23° C. In some embodiments, room temperature is 24° C. In some embodiments, room temperature is 25° C. In some embodiments, room temperature is 26° C. In some embodiments, room temperature is 27° C. In some embodiments, room temperature is 28° C. In some embodiments, room temperature is 29° C. In some embodiments, room temperature is 30° C.

"Alkyl" refers to an optionally substituted straight-chain, or optionally substituted branched-chain saturated hydrocarbon monoradical having from one to about ten carbon atoms, or from one to six carbon atoms, wherein a sp3-hybridized carbon of the alkyl residue is attached to the rest of the molecule by a single bond. Examples include, but are not limited to, methyl, ethyl, n-propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, n-butyl, isobutyl, sec-butyl, t-butyl, n-pentyl, isopentyl, neopentyl, tert-amyl and hexyl, and longer alkyl groups, such as heptyl, octyl, and the like. Whenever it appears herein, a numerical range such as "$C_1$-$C_6$ alkyl" means that the alkyl group consists of 1 carbon atom, 2 carbon atoms, 3 carbon atoms, 4 carbon atoms, 5 carbon atoms or 6 carbon atoms, although the present definition also covers the occurrence of the term "alkyl" where no numerical range is designated. In some embodiments, the alkyl is a $C_1$-$C_{10}$ alkyl, a $C_1$-$C_9$ alkyl, a $C_1$-$C_8$ alkyl, a $C_1$-$C_7$ alkyl, a $C_1$-$C_6$ alkyl, a $C_1$-$C_5$ alkyl, a $C_1$-$C_4$ alkyl, a $C_1$-$C_3$ alkyl, a $C_1$-$C_2$ alkyl, or a $C_1$ alkyl. Unless stated otherwise specifically in the specification, an alkyl group is optionally substituted as described below, for example, with oxo, halogen, amino, nitrile, nitro, hydroxyl, haloalkyl, alkoxy, aryl, cycloalkyl, heterocycloalkyl, heteroaryl, and the like. In some embodiments, the alkyl is optionally substituted with oxo, halogen, —CN, —CF$_3$, —OH, —OMe, —NH$_2$, or —NO$_2$. In some embodiments, the alkyl is optionally substituted with oxo, halogen, —CN, —CF$_3$, —OH, or —OMe.

"Alkoxy" refers to a radical of the formula —OR$_a$ where R$_a$ is an alkyl radical as defined. Unless stated otherwise specifically in the specification, an alkoxy group may be optionally substituted as described below, for example, with oxo, halogen, amino, nitrile, nitro, hydroxyl, haloalkyl, alkoxy, aryl, cycloalkyl, heterocycloalkyl, heteroaryl, and the like. In some embodiments, an alkoxy is optionally substituted with oxo, halogen, —CN, —CF$_3$, —OH, —OMe, —NH$_2$, or —NO$_2$. In some embodiments, an alkoxy is optionally substituted with oxo, halogen, —CN, —CF$_3$, —OH, or —OMe.

"Aryl" refers to a radical derived from a hydrocarbon ring system comprising hydrogen, 6 to 30 carbon atoms and at least one aromatic ring. The aryl radical may be a monocyclic, bicyclic, tricyclic or tetracyclic ring system, which may include fused (when fused with a cycloalkyl or heterocycloalkyl ring, the aryl is bonded through an aromatic ring atom) or bridged ring systems. In some embodiments, the aryl is a 6- to 10-membered aryl. In some embodiments, the aryl is a 6-membered aryl. Aryl radicals include, but are not limited to, aryl radicals derived from the hydrocarbon ring systems of anthrylene, naphthylene, phenanthrylene, anthracene, azulene, benzene, chrysene, fluoranthene, fluorene, as-indacene, s-indacene, indane, indene, naphthalene, phenalene, phenanthrene, pleiadene, pyrene, and triphenylene. In some embodiments, the aryl is phenyl. Unless stated otherwise specifically in the specification, an aryl may be optionally substituted as described below, for example, with halogen, amino, nitrile, nitro, hydroxyl, alkyl, haloalkyl, alkoxy, aryl, cycloalkyl, heterocycloalkyl, heteroaryl, and the like. In some embodiments, an aryl is optionally substituted with halogen, methyl, ethyl, —CN, —CF$_3$, —OH, —OMe, —NH$_2$, or —NO$_2$. In some embodiments, an aryl is optionally substituted with halogen, methyl, ethyl, —CN, —CF$_3$, —OH, or —OMe.

"Cycloalkyl" refers to a stable, partially, or fully saturated, monocyclic or polycyclic carbocyclic ring, which may include fused (when fused with an aryl or a heteroaryl ring, the cycloalkyl is bonded through a non-aromatic ring atom) or bridged ring systems. Representative cycloalkyls include, but are not limited to, cycloalkyls having from three to fifteen carbon atoms ($C_3$-$C_{15}$ cycloalkyl), from three to ten carbon atoms ($C_3$-$C_{10}$ cycloalkyl), from three to eight carbon atoms ($C_3$-$C_8$ cycloalkyl), from three to six carbon atoms ($C_3$-$C_6$ cycloalkyl), from three to five carbon atoms ($C_3$-$C_5$ cycloalkyl), or three to four carbon atoms ($C_3$-$C_4$ cycloalkyl). In some embodiments, the cycloalkyl is a 3- to 6-membered cycloalkyl. In some embodiments, the cycloalkyl is a 5- to 6-membered cycloalkyl. Monocyclic cycloalkyls include, for example, cyclopropyl, cyclobutyl, cyclopentyl, cyclohexyl, cycloheptyl, and cyclooctyl. Polycyclic cycloalkyls or carbocycles include, for example, adamantyl, norbornyl, decalinyl, bicyclo[3.3.0]octane, bicyclo[4.3.0]nonane, cis-decalin, trans-decalin, bicyclo[2.1.1]hexane, bicyclo[2.2.1]heptane, bicyclo[2.2.2]octane, bicyclo[3.2.2]nonane, bicyclo[3.3.2]decane, and 7,7-dimethyl-bicyclo[2.2.1]heptanyl. Partially saturated cycloalkyls include, for example cyclopentenyl, cyclohexenyl, cycloheptenyl, and cyclooctenyl. Unless stated otherwise specifically in the specification, a cycloalkyl is optionally substituted as described below, for example, with oxo, halogen, amino, nitrile, nitro, hydroxyl, alkyl, haloalkyl, alkoxy, aryl, cycloalkyl, heterocycloalkyl, heteroaryl, and the like. In some embodiments, a cycloalkyl is optionally substituted with oxo, halogen, methyl, ethyl, —CN, —$CF_3$, —OH, —OMe, —$NH_2$, or —$NO_2$. In some embodiments, a cycloalkyl is optionally substituted with oxo, halogen, methyl, ethyl, —CN, —$CF_3$, —OH, or —OMe.

"Halo" or "halogen" refers to bromo, chloro, fluoro, or iodo. In some embodiments, halogen is fluoro or chloro. In some embodiments, halogen is fluoro.

"Haloalkyl" refers to an alkyl radical, as defined above, that is substituted by one or more halo radicals, as defined above, e.g., trifluoromethyl, difluoromethyl, fluoromethyl, trichloromethyl, 2,2,2-trifluoroethyl, 1,2-difluoroethyl, 3-bromo-2-fluoropropyl, 1,2-dibromoethyl, and the like.

"Heterocycloalkyl" refers to a stable 3- to 24-membered partially or fully saturated ring radical comprising 2 to 23 carbon atoms and from one to 8 heteroatoms selected from the group consisting of nitrogen, oxygen, phosphorous, and sulfur. Unless stated otherwise specifically in the specification, the heterocycloalkyl radical may be a monocyclic, bicyclic, tricyclic or tetracyclic ring system, which may include fused (when fused with an aryl or a heteroaryl ring, the heterocycloalkyl is bonded through a non-aromatic ring atom) or bridged ring systems; and the nitrogen, carbon or sulfur atoms in the heterocycloalkyl radical may be optionally oxidized; the nitrogen atom may be optionally quaternized. In some embodiments, the heterocycloalkyl is a 3- to 6-membered heterocycloalkyl. In some embodiments, the heterocycloalkyl is a 5- to 6-membered heterocycloalkyl. Examples of such heterocycloalkyl radicals include, but are not limited to, aziridinyl, azetidinyl, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, 1,1-dioxo-thiomorpholinyl, 1,3-dihydroisobenzofuran-1-yl, 3-oxo-1,3-dihydroisobenzofuran-1-yl, methyl-2-oxo-1,3-dioxol-4-yl, and 2-oxo-1,3-dioxol-4-yl. The term heterocycloalkyl also includes all ring forms of the carbohydrates, including but not limited to the monosaccharides, the disaccharides and the oligosaccharides. Unless otherwise noted, heterocycloalkyls have from 2 to 10 carbons in the ring. It is understood that when referring to the number of carbon atoms in a heterocycloalkyl, the number of carbon atoms in the heterocycloalkyl is not the same as the total number of atoms (including the heteroatoms) that make up the heterocycloalkyl (i.e. skeletal atoms of the heterocycloalkyl ring). Unless stated otherwise specifically in the specification, a heterocycloalkyl is optionally substituted as described below, for example, with oxo, halogen, amino, nitrile, nitro, hydroxyl, alkyl, haloalkyl, alkoxy, aryl, cycloalkyl, heterocycloalkyl, heteroaryl, and the like. In some embodiments, a heterocycloalkyl is optionally substituted with oxo, halogen, methyl, ethyl, —CN, —$CF_3$, —OH, —OMe, —$NH_2$, or —$NO_2$. In some embodiments, a heterocycloalkyl is optionally substituted with oxo, halogen, methyl, ethyl, —CN, —$CF_3$, —OH, or —OMe.

"Heteroaryl" refers to a 5- to 14-membered ring system radical comprising hydrogen atoms, one to thirteen carbon atoms, one to six heteroatoms selected from the group consisting of nitrogen, oxygen, phosphorous and sulfur, and at least one aromatic ring. The heteroaryl radical may be a monocyclic, bicyclic, tricyclic or tetracyclic ring system, which may include fused (when fused with a cycloalkyl or heterocycloalkyl ring, the heteroaryl is bonded through an aromatic ring atom) or bridged ring systems; and the nitrogen, carbon or sulfur atoms in the heteroaryl radical may be optionally oxidized; the nitrogen atom may be optionally quaternized. In some embodiments, the heteroaryl is a 5- to 10-membered heteroaryl. In some embodiments, the heteroaryl is a 5- to 6-membered heteroaryl. Examples include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e., thienyl). Unless stated otherwise specifically in the specification, a heteroaryl is optionally substituted as described below, for example, with halogen, amino, nitrile, nitro, hydroxyl, alkyl, haloalkyl, alkoxy, aryl, cycloalkyl, heterocycloalkyl, heteroaryl, and the like. In some embodiments, a heteroaryl is optionally substituted with halogen, methyl, ethyl, —CN, —$CF_3$, —OH, —OMe, —$NH_2$, or —$NO_2$. In some embodiments, a heteroaryl is optionally substituted with halogen, methyl, ethyl, —CN, —$CF_3$, —OH, or —OMe.

Process for Preparation of Organo-Boron Compounds

In some embodiments, the starting materials and reagents used for the synthesis of the compounds described herein are synthesized or are obtained from commercial sources, such as, but not limited to, Sigma-Aldrich, Fisher Scientific (Fisher Chemical), and AcrosOrganics.

In further embodiments, the compounds described herein, and other related compounds having different substituents are synthesized using techniques and materials described herein as well as those that are recognized in the field, such as described, for example, in Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry 4$^{th}$ Ed., (Wiley 1992); Carey and Sundberg, Advanced Organic Chemistry 4$^{th}$ Ed., Vols. A and B (Plenum 2000, 2001), and Green and Wuts, Protective Groups in Organic Synthesis 3$^{rd}$ Ed., (Wiley 1999) (all of which are incorporated by reference for such disclosure).

Compounds described in WO/2014/089365, WO/2014/110442, WO/2014/151958, and WO/2015/191907 have been shown to be effective beta-lactamase inhibitors. The continued pharmaceutical development of these compounds requires ready access to large quantities of pure material. Common synthetic intermediates for many of these beta-lactamase inhibitors are boronic esters 2 and 3:

Compound 2

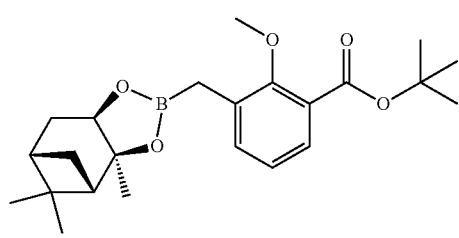

Compound 3

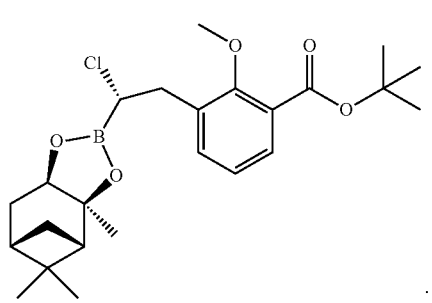

The synthesis of boronic esters, such as for example compound 3, includes the homologation of compound 2 by addition of a dihaloalkyllithium reagent to form an intermediate boron "ate" complex in the presence of a Lewis acid catalyst. The Lewis acid promotes the rearrangement reaction and minimizes epimerization at the alpha-carbon atom. Typically, rigorous exclusion of water, maintenance of very low temperature, and careful control of the base and Lewis acid stoichiometries are required for optimum results. These features render the reaction difficult to perform successfully on a production scale while avoiding formation of undesired side product, such as the dichloroketone side product:

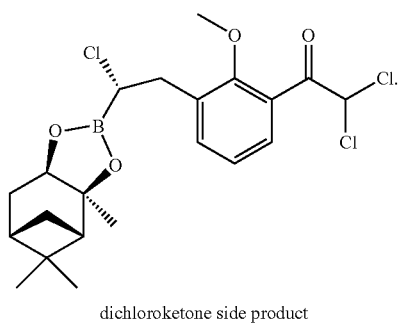 [SMILES: COc1c(C[C@@H](Cl)B2O[C@@H]3C[C@@H]4C[C@@H](C4(C)C)[C@]3(C)O2)cccc1C(=O)C(Cl)Cl]

dichloroketone side product

Thus a practical route to obtain large amounts of compounds 2 and 3 with low levels of impurity would greatly facilitate the pharmaceutical development of promising beta-lactamase inhibitors.

An important reaction for the processes described herein is known in the art as the Matteson reaction. The Matteson reaction has been reviewed (Matteson D S, *J. Org. Chem* (2013) 78, 10009-10023) and has found widespread use in the preparation of organoboron compounds, see for example: Martin et al *Tetrahedron Lett.* (1995) 36, 8399-8402; Matteson, D S, et al., *Organometallics* (1984) 3, 614-18; Burns C J, et al. (WO 2009/064414); Pickersgill I F, et al, (WO 2005/097809); and Burns C J, et al. (WO 2014/151958).

Described herein is a continuous flow process for making a compound of Formula (III):

Formula (III)

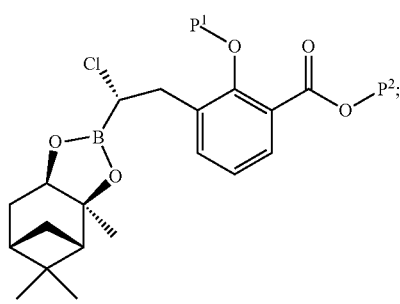

wherein
P$^1$ is a hydroxyl protecting group; and
P$^2$ is a carboxyl protecting group;
the process comprising:
(a) providing a first continuous flow of a compound of Formula (II) and dichloromethane:

Formula (II)

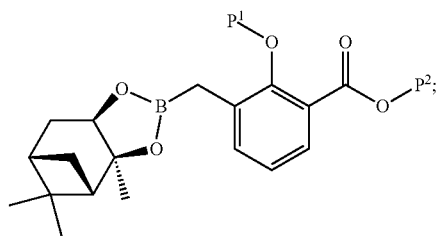

(b) providing a second continuous flow of a base selected from lithium diisopropylamide or 2,2,6,6-tetramethylpiperidinylmagnesium chloride:lithium chloride;

(c) mixing the first continuous flow and the second continuous flow in a mixing chamber to yield a third continuous flow comprising a first reactive intermediate;

(d) collecting the first reactive intermediate into a collection vessel at the output of the third continuous flow;

(e) treating the first reactive intermediate with a Lewis acid; and (f) warming the collection vessel to provide the compound of Formula (III).

In some embodiments of a continuous flow process for making a compound of Formula (III), the first reactive intermediate is collected into a collection vessel that does not have continuous outflow. In some embodiments of a continuous flow process for making a compound of Formula (III), the Lewis acid is provided as a fourth continuous flow. In some embodiments of a continuous flow process for making a compound of Formula (III), the forth continuous flow comprising the Lewis acid is added to the collection vessel prior to the collection of the first reactive intermediate. In some embodiments of a continuous flow process for making a compound of Formula (III), the forth continuous flow comprising the Lewis acid is added to the collection vessel after the collection of the first reactive intermediate.

In some embodiments of a continuous flow process for making a compound of Formula (III), the first continuous flow further comprises a coordinating ethereal solvent. In some embodiments of a continuous flow process for making a compound of Formula (III), the first continuous flow further comprises a coordinating ethereal solvent selected from 2-methyltetrahydrofuran and tetrahydrofuran. In some embodiments of a continuous flow process for making a compound of Formula (III), the first continuous flow further comprises a coordinating ethereal solvent that is 2-methyltetrahydrofuran. In some embodiments of a continuous flow process for making a compound of Formula (III), the water content of the coordinating ethereal solvent comprised in the first continuous flow is less than about 0.08% (w/w). In some embodiments of a continuous flow process for making a compound of Formula (III), the water content of the coordinating ethereal solvent comprised in the first continuous flow is less than about 0.05% (w/w). In some embodiments of a continuous flow process for making a compound of Formula (III), the water content of the coordinating ethereal solvent comprised in the first continuous flow is between about 0.01% and about 0.15% (w/w). In some embodiments of a continuous flow process for making a compound of Formula (III), the water content of the coordinating ethereal solvent comprised in the first continuous flow is between about 0.01% and about 0.08% (w/w). In some embodiments of a continuous flow process for making a compound of Formula (III), the water content of the coordinating ethereal solvent comprised in the first continuous flow is between about 0.01% and about 0.05% (w/w). In some embodiments of a continuous flow process for making a compound of Formula (III), the coordinating ethereal solvent comprised in the first continuous flow is substantially free of water.

In some embodiments of a continuous flow process for making a compound of Formula (III), the second continuous flow further comprises a coordinating ethereal solvent. In some embodiments of a continuous flow process for making a compound of Formula (III), the second continuous flow further comprises a coordinating ethereal solvent selected from 2-methyltetrahydrofuran and tetrahydrofuran. In some embodiments of a continuous flow process for making a compound of Formula (III), the second continuous flow further comprises a coordinating ethereal solvent that is 2-methyltetrahydrofuran. In some embodiments of a continuous flow process for making a compound of Formula (III), the water content of the coordinating ethereal solvent comprised in the second continuous flow is less than about 0.08% (w/w). In some embodiments of a continuous flow process for making a compound of Formula (III), the water content of the coordinating ethereal solvent comprised in the second continuous flow is less than about 0.05% (w/w). In some embodiments of a continuous flow process for making a compound of Formula (III), the water content of the coordinating ethereal solvent comprised in the second continuous flow is between about 0.01% and about 0.15% (w/w). In some embodiments of a continuous flow process for making a compound of Formula (III), the water content of the coordinating ethereal solvent comprised in the second continuous flow is between about 0.01% and about 0.08% (w/w). In some embodiments of a continuous flow process for making a compound of Formula (III), the water content of the coordinating ethereal solvent comprised in the second continuous flow is between about 0.01% and about 0.05% (w/w). In some embodiments of a continuous flow process for making a compound of Formula (III), the coordinating ethereal solvent comprised in the second continuous flow is substantially free of water.

In some embodiments of a continuous flow process for making a compound of Formula (III), the second continuous flow further comprises heptane, ethyl benzene, or a combination thereof.

In some embodiments of a continuous flow process for making a compound of Formula (III), the Lewis acid is provided in a fourth continuous flow. In some embodiments of a continuous flow process for making a compound of Formula (III), the fourth continuous flow further comprises a coordinating ethereal solvent. In some embodiments of a continuous flow process for making a compound of Formula (III), the fourth continuous flow further comprises a coordinating ethereal solvent selected from 2-methyltetrahydrofuran and tetrahydrofuran. In some embodiments of a continuous flow process for making a compound of Formula (III), the fourth continuous flow further comprises a coordinating ethereal solvent that is 2-methyltetrahydrofuran. In some embodiments of a continuous flow process for making a compound of Formula (III), the water content of the coordinating ethereal solvent comprised in the fourth continuous flow is less than about 0.08% (w/w). In some embodiments of a continuous flow process for making a compound of Formula (III), the water content of the coordinating ethereal solvent comprised in the fourth continuous flow is less than about 0.05% (w/w). In some embodiments of a continuous flow process for making a compound of Formula (III), the water content of the coordinating ethereal solvent comprised in the fourth continuous flow is between about 0.01% and about 0.15% (w/w). In some embodiments of a continuous flow process for making a compound of Formula (III), the water content of the coordinating ethereal solvent comprised in the fourth continuous flow is between about 0.01% and about 0.08% (w/w). In some embodiments of a continuous flow process for making a compound of Formula (III), the water content of the coordinating ethereal solvent comprised in the fourth continuous flow is between about 0.01% and about 0.05% (w/w). In some embodiments of a continuous flow process for making a compound of Formula (III), the coordinating ethereal solvent comprised in the fourth continuous flow is substantially free of water.

In some embodiments of a continuous flow process for making a compound of Formula (III), the base is substantially free of water.

In some embodiments of a continuous flow process for making a compound of Formula (III), the heptane, ethyl benzene, or a combination thereof is substantially free of water.

In some embodiments of a continuous flow process for making a compound of Formula (III), the process further comprises pre-cooling the first continuous flow to a temperature in the range of about −60° C. to about −30° C. In some embodiments of a continuous flow process for making a compound of Formula (III), the process further comprises pre-cooling the first continuous flow to a temperature in the range of about −40° C. to about 0° C. In some embodiments of a continuous flow process for making a compound of Formula (III), the process further comprises pre-cooling the first continuous flow to a temperature in the range of about −40° C. to about −10° C. In some embodiments of a continuous flow process for making a compound of Formula (III), the process further comprises pre-cooling the first continuous flow to a temperature in the range of about −40° C. to about −20° C. In some embodiments of a continuous flow process for making a compound of Formula (III), the process further comprises pre-cooling the first continuous flow to a temperature in the range of about −40° C. to about −30° C.

In some embodiments of a continuous flow process for making a compound of Formula (III), the temperature of the first continuous flow directly correlates with the amount of impurities generated. In some embodiments of a continuous flow process for making a compound of Formula (III), the temperature of the first continuous flow directly correlates with the amount of the dichloroketone side product (Formula (IV)) formed. In some embodiments of a continuous flow process for making a compound of Formula (III), a first continuous flow maintained at a very low temperature, such as a temperature below about −40° C., about −45° C., about −50° C., about −55° C., or about −60° C. results in increased formation of dichloroketone side product (Formula (IV).

In some embodiments of a continuous flow process for making a compound of Formula (III), the process further comprises pre-cooling the second continuous flow to a temperature in the range of about −60° C. to about −30° C. In some embodiments of a continuous flow process for making a compound of Formula (III), the process further comprises pre-cooling the second continuous flow to a temperature in the range of about −40° C. to about 0° C. In some embodiments of a continuous flow process for making a compound of Formula (III), the process further comprises pre-cooling the second continuous flow to a temperature in the range of about −40° C. to about −10° C. In some embodiments of a continuous flow process for making a compound of Formula (III), the process further comprises pre-cooling the second continuous flow to a temperature in the range of about −40° C. to about −20° C. In some embodiments of a continuous flow process for making a compound of Formula (III), the process further comprises pre-cooling the second continuous flow to a temperature in the range of about −40° C. to about −30° C.

In some embodiments of a continuous flow process for making a compound of Formula (III), the temperature of the second continuous flow directly correlates with the amount of impurities generated. In some embodiments of a continuous flow process for making a compound of Formula (III), the temperature of the second continuous flow directly correlates with the amount of the dichloroketone side product (Formula (IV)) formed. In some embodiments of a continuous flow process for making a compound of Formula (III), a second continuous flow maintained at a very low temperature such as a temperature below about −40° C., about −45° C., about −50° C., about −55° C., or about −60° C. results in increased formation of dichloroketone side product (Formula (IV).

In some embodiments of a continuous flow process for making a compound of Formula (III), the process further comprises pre-cooling the first continuous flow and the second continuous flow to a temperature in the range of about −40° C. to about 0° C. In some embodiments of a continuous flow process for making a compound of Formula (III), the process further comprises pre-cooling the first continuous flow and the second continuous flow to a temperature in the range of about −40° C. to about −10° C. In some embodiments of a continuous flow process for making a compound of Formula (III), the process further comprises pre-cooling the first continuous flow and the second continuous flow to a temperature in the range of about −40° C. to about −20° C. In some embodiments of a continuous flow process for making a compound of Formula (III), the process further comprises pre-cooling the first continuous flow and the second continuous flow to a temperature in the range of about −40° C. to about −30° C.

In some embodiments of a continuous flow process for making a compound of Formula (III), the temperature of the first continuous flow and second continuous flow directly correlates with the amount of impurities generated. In some embodiments of a continuous flow process for making a compound of Formula (III), the temperature of the first continuous flow and second continuous flow directly correlates with the amount of the dichloroketone side product (Formula (IV)) formed. In some embodiments of a continuous flow process for making a compound of Formula (III), a first continuous flow and a second continuous flow maintained at a very low temperature such as a temperature below about −40° C., about −45° C., about −50° C., about −55° C., or about −60° C. results in increased formation of dichloroketone side product (Formula (IV).

In some embodiments of a continuous flow process for making a compound of Formula (III), the process further comprises maintaining the mixing chamber at a temperature in the range of about −60° C. to about −30° C. In some embodiments of a continuous flow process for making a compound of Formula (III), the temperature of the mixing chamber is not controlled.

In some embodiments of a continuous flow process for making a compound of Formula (III), the temperature of the mixing chamber directly correlates with the amount of impurities generated. In some embodiments of a continuous flow process for making a compound of Formula (III), the temperature of the mixing chamber directly correlates with the amount of the dichloroketone side product (Formula (IV)) formed. In some embodiments of a continuous flow process for making a compound of Formula (III), a mixing chamber maintained at a very low temperature such as a temperature below about −40° C., about −45° C., about −50° C., about −55° C., or about −60° C. results in increased formation of dichloroketone side product (Formula (IV).

In some embodiments of a continuous flow process for making a compound of Formula (III), the mixing in the mixing chamber is performed over about 50 milliseconds to about 500 milliseconds. In some embodiments of a continuous flow process for making a compound of Formula (III), the mixing in the mixing chamber is performed over about 50 milliseconds to about 200 milliseconds. In some embodiments of a continuous flow process for making a compound of Formula (III), the mixing in the mixing chamber is performed over less than about 200 milliseconds. In some embodiments of a continuous flow process for making a compound of Formula (III), the mixing in the mixing chamber is performed over less than about 190 milliseconds, less than about 180 milliseconds, less than about 170 milliseconds, less than about 160 milliseconds, less than about 150 milliseconds, less than about 140 milliseconds, less than about 130 milliseconds, less than about 120 milliseconds, less than about 110 milliseconds, or less than about 100 milliseconds.

In some embodiments of a continuous flow process for making a compound of Formula (III), the mixing time in the mixing chamber directly correlates with the amount of impurities generated. In some embodiments of a continuous flow process for making a compound of Formula (III), longer mixing time than about 200 milliseconds in the mixing chamber correlates with higher levels of starting material (Compound of Formula (II)) and higher levels of dichloroketone side product (Formula (IV).

In some embodiments of a continuous flow process for making a compound of Formula (III), the process further comprises maintaining the third continuous flow at a temperature in the range of about −60° C. to about −30° C. In some embodiments of a continuous flow process for making a compound of Formula (III), the temperature of the third continuous flow is not controlled. In some embodiments of a continuous flow process for making a compound of Formula (III), the third continuous flow has a temperature in the range of about −20° C. to about +10° C. In some embodiments of a continuous flow process for making a compound of Formula (III), the third continuous flow has a temperature that is about 20° C. higher than the temperature of the first continuous flow or the temperature of the second continuous flow. In some embodiments of a continuous flow process for making a compound of Formula (III), the rise in temperature observed in the third continuous flow is governed by the reaction between the first continuous flow comprising a compound of Formula (II) and dichloromethane and the second continuous flow comprising a base to form the first reactive intermediate.

In some embodiments of a continuous flow process for making a compound of Formula (III), the process further comprises maintaining the collection vessel at the output of the third continuous flow at a temperature in the range of about −50° C. to about −15° C. In some embodiments of a continuous flow process for making a compound of Formula (III), the process further comprises maintaining the collection vessel at the output of the third continuous flow at a temperature in the range of about −10° C. to about +10° C. In some embodiments of a continuous flow process for making a compound of Formula (III), the process further comprises maintaining the collection vessel at the output of the third continuous flow at a temperature in the range of about −5° C. to about +5° C. In some embodiments of a continuous flow process for making a compound of Formula (III), the process further comprises maintaining the collection vessel at the output of the third continuous flow at a temperature of about 0° C.

In some embodiments of a continuous flow process for making a compound of Formula (III), the warming of the vessel occurs to a temperature above about −15° C. In some embodiments of a continuous flow process for making a compound of Formula (III), the collection vessel is warmed to a temperature above about −15° C. in step (f). In some embodiments of a continuous flow process for making a compound of Formula (III), the collection vessel is warmed to room temperature in step (f).

In some embodiments of a continuous flow process for making a compound of Formula (III), the molar ratio of the base to a compound of Formula (II) is in the range of about 1:1 to about 2:1. In some embodiments of a continuous flow process for making a compound of Formula (III), the molar ratio of the base to a compound of Formula (II) is in the range of about 1.2:1 to about 1.4:1. In some embodiments of a continuous flow process for making a compound of Formula (III), the molar ratio of the base to a compound of Formula (II) is in the range of about 1:1 to about 1.3:1. In some embodiments of a continuous flow process for making a compound of Formula (III), the molar ratio of the base to a compound of Formula (II) is in the range of about 1:1 to about 1.5:1. In some embodiments of a continuous flow process for making a compound of Formula (III), the molar ratio of the base to a compound of Formula (II) is in the range of about 1:1 to about 1.25:1. In some embodiments of a continuous flow process for making a compound of Formula (III), the molar ratio of the base to a compound of Formula (II) is about 1:1, about 1.1:1, about 1.2:1, about 1.3:1, about 1.4:1, about 1.5:1, about 1.6:1, about 1.7:1, about 1.8:1, about 1.9:1, or about 2:1.

In some embodiments of a continuous flow process for making a compound of Formula (III), the amount of excess base used directly correlates with the amount of impurities generated. In some embodiments of a continuous flow process for making a compound of Formula (III), the amount of base used directly correlates with the amount of the dichloroketone side product (Formula (IV)) formed. In some embodiments of a continuous flow process for making a compound of Formula (III), a large excess of base results in increased formation of dichloroketone side product (Formula (IV).

In some embodiments of a continuous flow process for making a compound of Formula (III), the molar ratio of the dichloromethane to a compound of Formula (II) is in the range of about 1:1 to about 10:1. In some embodiments of a continuous flow process for making a compound of Formula (III), the molar ratio of the dichloromethane to a compound of Formula (II) is in the range of about 2:1 to about 9:1. In some embodiments of a continuous flow process for making a compound of Formula (III), the molar ratio of the dichloromethane to a compound of Formula (II) is in the range of about 3:1 to about 8:1. In some embodiments of a continuous flow process for making a compound of Formula (III), the molar ratio of the dichloromethane to a compound of Formula (II) is in the range of about 4:1 to about 7:1. In some embodiments of a continuous flow process for making a compound of Formula (III), the molar ratio of the dichloromethane to a compound of Formula (II) is in the range of about 5:1 to about 7:1. In some embodiments of a continuous flow process for making a compound of Formula (III), the molar ratio of the dichloromethane to a compound of Formula (II) is in the range of about 6:1 to about 7:1.

In some embodiments of a continuous flow process for making a compound of Formula (III), the molar ratio of the Lewis acid to a compound of Formula (II) is in the range of about 1:1 to about 3:1. In some embodiments of a continuous flow process for making a compound of Formula (III), the molar ratio of the Lewis acid to a compound of Formula (II) is in the range of about 1:1 to about 2:1. In some embodiments of a continuous flow process for making a compound of Formula (III), the molar ratio of the Lewis acid to a compound of Formula (II) is in the range of about 1.6:1 to about 2:1.

In some embodiments of a continuous flow process for making a compound of Formula (III), the process further comprises pumping the compound of Formula (III) out of the collection vessel into a workup tank. In some embodiments of a continuous flow process for making a compound of Formula (III), the workup tank comprises a buffered solution.

In some embodiments of a continuous flow process for making a compound of Formula (III), the process further comprises working up the reaction with a buffered solution in the collection tank.

In some embodiments of a continuous flow process for making a compound of Formula (III), the pH of the buffered solution is about 6. In some embodiments of a continuous flow process for making a compound of Formula (III), the buffered solution comprises a chelating agent. In some embodiments of a continuous flow process for making a compound of Formula (III), the buffered solution comprises citric acid, tartaric acid, EDTA, or a combination thereof. In some embodiments of a continuous flow process for making a compound of Formula (III), the process further comprises maintaining the temperature of the workup tank at a temperature in the range of about −25° C. to about 0° C. In some embodiments of a continuous flow process for making a compound of Formula (III), the process further comprises maintaining the temperature of the workup tank at a temperature in the range of about −10° C. to about +10° C.

In some embodiments of a continuous flow process for making a compound of Formula (III), the base is lithium diisopropylamide. In some embodiments of a continuous flow process for making a compound of Formula (III), the base is 2,2,6,6-tetramethylpiperidinylmagnesium chloride: lithium chloride.

In some embodiments of a continuous flow process for making a compound of Formula (III), the Lewis acid is $ZnCl_2$.

In some embodiments of a continuous flow process for making a compound of Formula (III), the compound of Formula (III) is obtained in about 90% to about 98% yield (mole %). In some embodiments of a continuous flow process for making a compound of Formula (III), the compound of Formula (III) is obtained in about 90% to about 95% yield. In some embodiments of a continuous flow process for making a compound of Formula (III), the compound of Formula (III) is obtained in about 90%, about 91%, about 92%, about 93%, about 94%, about 95%, about 96%, about 97%, or about 98% yield.

In some embodiments of a continuous flow process for making a compound of Formula (III), the process further generates less than about 2% (mole %) of a compound of Formula (IV):

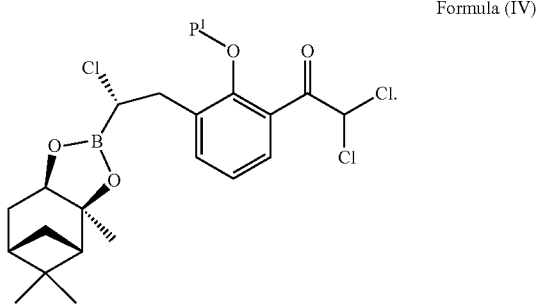

Formula (IV)

In some embodiments of a continuous flow process for making a compound of Formula (III), the process further generates less than about 3% (mole %) of a compound of Formula (IV). In some embodiments of a continuous flow process for making a compound of Formula (III), the process further generates less than about 4% (mole %) of a compound of Formula (IV). In some embodiments of a continuous flow process for making a compound of Formula (III), the process further generates less than about 5% (mole %) of a compound of Formula (IV).

In some embodiments of a continuous flow process for making a compound of Formula (III), the process further generates less than about 2% (mole %) of a compound of Formula (V):

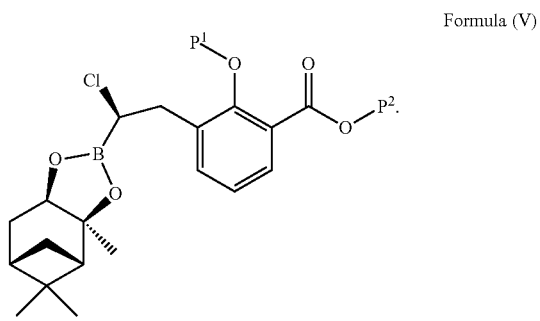

Formula (V)

In some embodiments of a continuous flow process for making a compound of Formula (III), the process further generates less than about 3% (mole %) of a compound of Formula (V). In some embodiments of a continuous flow process for making a compound of Formula (III), the process further generates less than about 4% (mole %) of a compound of Formula (V). In some embodiments of a continuous flow process for making a compound of Formula (III), the process further generates less than about 5% (mole %) of a compound of Formula (V).

In some embodiments of a continuous flow process for making a compound of Formula (III), less than about 2% (mole %) of a compound of Formula (II) remains unreacted. In some embodiments of a continuous flow process for making a compound of Formula (III), less than about 3% (mole %) of a compound of Formula (II) remains unreacted. In some embodiments of a continuous flow process for making a compound of Formula (III), less than about 4% (mole %) of a compound of Formula (II) remains unreacted. In some embodiments of a continuous flow process for making a compound of Formula (III), less than about 5% (mole %) of a compound of Formula (II) remains unreacted.

In some embodiments of a continuous flow process for making a compound of Formula (III), $P^1$ is methyl. In some embodiments of a continuous flow process for making a compound of Formula (III), $P^2$ is tert-butyl.

Also disclosed herein is a continuous flow process for making a compound of Formula (II):

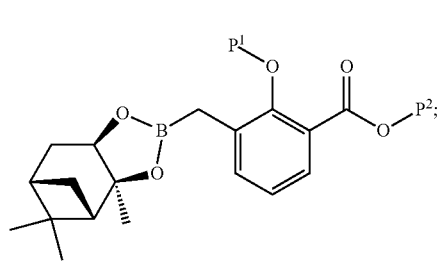

Formula (II)

wherein
P¹ is a hydroxyl protecting group; and
P² is a carboxyl protecting group;
the process comprising:
(a) providing a first continuous flow of a compound of Formula (I) and chloroiodomethane:

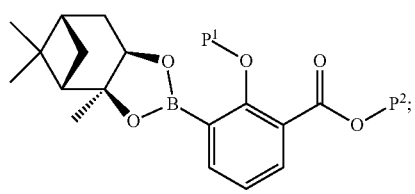

Formula (I)

(b) providing a second continuous flow of a hindered Grignard reagent selected from isopropylmagnesium chloride, isobutylmagnesium chloride, isopropylmagnesium chloride:lithium chloride, and isobutylmagnesium chloride:lithium chloride;
(c) mixing the first continuous flow and the second continuous flow in a mixing chamber to yield a third continuous flow comprising a first reactive intermediate;
(d) collecting the first reactive intermediate into a collection vessel at the output of the third continuous flow;
(e) warming the collection vessel to provide the compound of Formula (II).

In some embodiments of a continuous flow process for making a compound of Formula (II), the first reactive intermediate is collected into a collection vessel that does not have continuous outflow.

In some embodiments of a continuous flow process for making a compound of Formula (II), the first continuous flow further comprises a coordinating ethereal solvent. In some embodiments of a continuous flow process for making a compound of Formula (II), the first continuous flow further comprises a coordinating ethereal solvent selected from 2-methyltetrahydrofuran and tetrahydrofuran. In some embodiments of a continuous flow process for making a compound of Formula (II), the first continuous flow further comprises a coordinating ethereal solvent that is tetrahydrofuran. In some embodiments of a continuous flow process for making a compound of Formula (II), the water content of the coordinating ethereal solvent comprised in the first continuous flow is less than about 0.08% (w/w). In some embodiments of a continuous flow process for making a compound of Formula (II), the water content of the coordinating ethereal solvent comprised in the first continuous flow is less than about 0.05% (w/w). In some embodiments of a continuous flow process for making a compound of Formula (II), the water content of the coordinating ethereal solvent comprised in the first continuous flow is between about 0.01% and about 0.15% (w/w). In some embodiments of a continuous flow process for making a compound of Formula (II), the water content of the coordinating ethereal solvent comprised in the first continuous flow is between about 0.01% and about 0.08% (w/w). In some embodiments of a continuous flow process for making a compound of Formula (II), the water content of the coordinating ethereal solvent comprised in the first continuous flow is between about 0.01% and about 0.05% (w/w). In some embodiments of a continuous flow process for making a compound of Formula (II), the coordinating ethereal solvent comprised in the first continuous flow is substantially free of water.

In some embodiments of a continuous flow process for making a compound of Formula (II), the second continuous flow further comprises a coordinating ethereal solvent. In some embodiments of a continuous flow process for making a compound of Formula (II), the second continuous flow further comprises a coordinating ethereal solvent selected from 2-methyltetrahydrofuran and tetrahydrofuran. In some embodiments of a continuous flow process for making a compound of Formula (II), the second continuous flow further comprises a coordinating ethereal solvent that is tetrahydrofuran. In some embodiments of a continuous flow process for making a compound of Formula (II), the water content of the coordinating ethereal solvent comprised in the second continuous flow is less than about 0.08% (w/w). In some embodiments of a continuous flow process for making a compound of Formula (II), the water content of the coordinating ethereal solvent comprised in the second continuous flow is less than about 0.05% (w/w). In some embodiments of a continuous flow process for making a compound of Formula (II), the water content of the coordinating ethereal solvent comprised in the second continuous flow is between about 0.01% and about 0.15% (w/w). In some embodiments of a continuous flow process for making a compound of Formula (II), the water content of the coordinating ethereal solvent comprised in the second continuous flow is between about 0.01% and about 0.08% (w/w). In some embodiments of a continuous flow process for making a compound of Formula (II), the water content of the coordinating ethereal solvent comprised in the second continuous flow is between about 0.01% and about 0.05% (w/w). In some embodiments of a continuous flow process for making a compound of Formula (II), the coordinating ethereal solvent comprised in the second continuous flow is substantially free of water.

In some embodiments of a continuous flow process for making a compound of Formula (II), the process further comprises pre-cooling the first continuous flow to a temperature in the range of about −40° C. to about 0° C. In some embodiments of a continuous flow process for making a compound of Formula (II), the process further comprises pre-cooling the first continuous flow to a temperature in the range of about −30° C. to about 0° C. In some embodiments of a continuous flow process for making a compound of Formula (II), the process further comprises pre-cooling the first continuous flow to a temperature in the range of about −20° C. to about 0° C. In some embodiments of a continuous flow process for making a compound of Formula (II), the process further comprises pre-cooling the first continuous flow to a temperature in the range of about −40° C. to about −10° C. In some embodiments of a continuous flow process for making a compound of Formula (II), the process further comprises pre-cooling the first continuous flow to a temperature in the range of about −40° C. to about −20° C. In some embodiments of a continuous flow process for making a compound of Formula (II), the process further comprises pre-cooling the first continuous flow to a temperature in the range of about −40° C. to about −30° C.

In some embodiments of a continuous flow process for making a compound of Formula (II), the process further comprises pre-cooling the second continuous flow to a temperature in the range of about −40° C. to about 0° C. In some embodiments of a continuous flow process for making a compound of Formula (II), the process further comprises pre-cooling the second continuous flow to a temperature in the range of about −30° C. to about 0° C. In some embodiments of a continuous flow process for making a compound of Formula (II), the process further comprises pre-cooling the second continuous flow to a temperature in the range of about −20° C. to about 0° C. In some embodiments of a continuous flow process for making a compound of Formula (II), the process further comprises pre-cooling the second continuous flow to a temperature in the range of about −40° C. to about −10° C. In some embodiments of a continuous flow process for making a compound of Formula (II), the process further comprises pre-cooling the second continuous flow to a temperature in the range of about −40° C. to about −20° C. In some embodiments of a continuous flow process for making a compound of Formula (II), the process further comprises pre-cooling the second continuous flow to a temperature in the range of about −40° C. to about −30° C.

In some embodiments of a continuous flow process for making a compound of Formula (II), the process further comprises pre-cooling the first continuous flow and the second continuous flow to a temperature in the range of about −40° C. to about 0° C. In some embodiments of a continuous flow process for making a compound of Formula (II), the process further comprises pre-cooling the first continuous flow and the second continuous flow to a temperature in the range of about −30° C. to about 0° C. In some embodiments of a continuous flow process for making a compound of Formula (II), the process further comprises pre-cooling the first continuous flow and the second continuous flow to a temperature in the range of about −20° C. to about 0° C. In some embodiments of a continuous flow process for making a compound of Formula (II), the process further comprises pre-cooling the first continuous flow and the second continuous flow to a temperature in the range of about −40° C. to about −10° C. In some embodiments of a continuous flow process for making a compound of Formula (II), the process further comprises pre-cooling the first continuous flow and the second continuous flow to a temperature in the range of about −40° C. to about −20° C. In some embodiments of a continuous flow process for making a compound of Formula (II), the process further comprises pre-cooling the first continuous flow and the second continuous flow to a temperature in the range of about −40° C. to about −30° C.

In some embodiments of a continuous flow process for making a compound of Formula (II), the temperature of the mixing chamber is not controlled.

In some embodiments of a continuous flow process for making a compound of Formula (II), the mixing in the mixing chamber is performed over about 500 milliseconds to about 1 second. In some embodiments of a continuous flow process for making a compound of Formula (II), the mixing in the mixing chamber is performed over about 700 milliseconds to about 1 second. In some embodiments of a continuous flow process for making a compound of Formula (II), the mixing in the mixing chamber is performed over less than about 1 second. In some embodiments of a continuous flow process for making a compound of Formula (II), the mixing in the mixing chamber is performed over less than about 950 milliseconds, less than about 900 milliseconds, less than about 850 milliseconds, less than about 800 milliseconds, less than about 750 milliseconds, less than about 700 milliseconds, less than about 650 milliseconds, less than about 600 milliseconds, less than about 550 milliseconds, or less than about 500 milliseconds.

In some embodiments of a continuous flow process for making a compound of Formula (II), the temperature of the third continuous flow is not controlled.

In some embodiments of a continuous flow process for making a compound of Formula (II), the third continuous flow has a temperature in the range of about −20° C. to about +10° C. In some embodiments of a continuous flow process for making a compound of Formula (II), the rise in temperature observed in the third continuous flow is governed by the reaction between the first continuous flow comprising a compound of Formula (I) and chloroiodomethane and the second continuous flow comprising a hindered Grignard reagent to form the first reactive intermediate.

In some embodiments of a continuous flow process for making a compound of Formula (II), the process further comprises maintaining the collection vessel at the output of the third continuous flow at a temperature in the range of about −10° C. to about +10° C. In some embodiments of a continuous flow process for making a compound of Formula (II), the process further comprises maintaining the collection vessel at the output of the third continuous flow at a temperature in the range of about −5° C. to about +5° C. In some embodiments of a continuous flow process for making a compound of Formula (II), the process further comprises maintaining the collection vessel at the output of the third continuous flow at a temperature of about 0° C.

In some embodiments of a continuous flow process for making a compound of Formula (II), the collection vessel is warmed to room temperature in step (e).

In some embodiments of a continuous flow process for making a compound of Formula (II), the molar ratio of the hindered Grignard reagent to a compound of Formula (I) is in the range of about 1:1 to about 2:1. In some embodiments of a continuous flow process for making a compound of Formula (II), the molar ratio of the hindered Grignard reagent to a compound of Formula (I) is in the range of about 1.2:1 to about 1.4:1. In some embodiments of a continuous flow process for making a compound of Formula (II), the molar ratio of the hindered Grignard reagent to a compound of Formula (I) is in the range of about 1:1 to about 1.3:1. In some embodiments of a continuous flow process for making a compound of Formula (II), the molar ratio of the hindered Grignard reagent to a compound of Formula (I) is in the range of about 1:1 to about 1.5:1. In some embodiments of a continuous flow process for making a compound of Formula (II), the molar ratio of the hindered Grignard reagent to a compound of Formula (I) is in the range of about 1:1 to about 1.25:1. In some embodiments of a continuous flow process for making a compound of Formula (II), the molar ratio of the hindered Grignard reagent to a compound of Formula (I) is about 1:1, about 1.1:1, about 1.2:1, about 1.3:1, about 1.4:1, about 1.5:1, about 1.6:1, about 1.7:1, about 1.8:1, about 1.9:1, or about 2:1.

In some embodiments of a continuous flow process for making a compound of Formula (II), the molar ratio of the chloroiodomethane to a compound of Formula (I) is in the range of about 1:1 to about 2:1. In some embodiments of a continuous flow process for making a compound of Formula (II), the molar ratio of the chloroiodomethane to a compound of Formula (I) is in the range of about 1.2:1 to about 1.4:1. In some embodiments of a continuous flow process for making a compound of Formula (II), the molar ratio of the chloroiodomethane to a compound of Formula (I) is in the range of about 1:1 to about 1.3:1. In some embodiments of a continuous flow process for making a compound of Formula (II), the molar ratio of the chloroiodomethane to a compound of Formula (I) is in the range of about 1:1 to about 1.5:1. In some embodiments of a continuous flow process for making a compound of Formula (II), the molar ratio of the chloroiodomethane to a compound of Formula (I) is in the range of about 1:1 to about 1.25:1. In some embodiments of a continuous flow process for making a compound of Formula (II), the molar ratio of the chloroiodomethane to a compound of Formula (I) is about 1:1, about 1.1:1, about 1.2:1, about 1.3:1, about 1.4:1, about 1.5:1, about 1.6:1, about 1.7:1, about 1.8:1, about 1.9:1, or about 2:1.

In some embodiments of a continuous flow process for making a compound of Formula (II), the hindered Grignard reagent is selected from isopropylmagnesium chloride, isobutylmagnesium chloride, and isopropylmagnesium chloride:lithium chloride. In some embodiments of a continuous flow process for making a compound of Formula (II), the hindered Grignard reagent is isopropylmagnesium chloride:lithium chloride.

In some embodiments of a continuous flow process for making a compound of Formula (II), the compound of Formula (II) is obtained in about 90% to about 98% yield (mole %). In some embodiments of a continuous flow process for making a compound of Formula (II), the compound of Formula (II) is obtained in about 90% to about 95% yield. In some embodiments of a continuous flow process for making a compound of Formula (II), the compound of Formula (II) is obtained in about 90%, about 91%, about 92%, about 93%, about 94%, about 95%, about 96%, about 97%, or about 98% yield.

In some embodiments of a continuous flow process for making a compound of Formula (II), $P^1$ is methyl. In some embodiments of a continuous flow process for making a compound of Formula (II), $P^2$ is tert-butyl.

Also disclosed herein is a compound of Formula (A), or a pharmaceutically acceptable salt, solvate, or stereoisomer thereof:

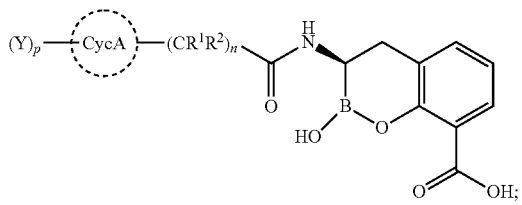

Formula (A)

wherein
n is 0, 1, 2, or 3;
p is 1, 2, or 3;
CycA is an optionally substituted 3-10 membered cycloalkyl;
each Y is independently —NR$^4$R$^5$, —NR$^4$C(=NR$^5$)NR$^4$R$^5$, —C(=NR$^4$)NR$^4$R$^5$, —N(R$^4$)C(=NR$^5$)R$^6$, —(CR$^6$R$^7$)$_v$NR$^4$R$^5$, —(CR$^6$R$^7$)$_v$N(R$^4$)C(=NR$^5$)NR$^4$R$^5$, —NR$^4$(CR$^6$R$^7$)$_v$NR$^4$R$^5$, —NR$^4$(CR$^6$R$^7$)$_v$OR$^{10}$, —(CR$^6$R$^7$)$_v$NR$^4$(CR$^6$R$^7$)$_v$NR$^4$R$^5$, —NR$^5$C(=NR$^5$)NR$^4$(CR$^6$R$^7$)$_v$NR$^4$R$^5$, —NR$^4$(CR$^6$R$^7$)$_v$N(R$^5$)C(=NR$^5$)NR$^4$R$^5$, —NR$^5$C(O)CR$^6$(NR$^4$R$^5$)(CR$^6$R$^7$)$_v$NR$^4$R$^5$, —(CR$^6$R$^7$)$_v$C(=NR$^5$)NR$^4$R$^5$, —(CR$^6$R$^7$)$_v$N(R$^4$)C(O)(CR$^6$R$^7$)$_v$NR$^4$R$^5$, and —O(CR$^6$R$^7$)$_v$NR$^4$R$^5$;

each $R^1$ and $R^2$ are independently hydrogen, halogen, optionally substituted $C_1$-$C_6$ alkyl, optionally substituted $C_3$-$C_6$ cycloalkyl, —OR$^{10}$, —SR$^{10}$, or —NR$^4$N$^5$;

or $R^1$ and $R^2$ on the same carbon are taken together form an oxo, an optionally substituted oxime, an optionally substituted carbocycle, or optionally substituted heterocycle;

each $R^4$ and $R^5$ are independently hydrogen, —OH, —CN, optionally substituted $C_1$-$C_6$ alkyl, optionally substituted cycloalkyl, optionally substituted heterocycloalkyl, optionally substituted aryl, or optionally substituted heteroaryl;

or $R^4$ and $R^5$ are taken together with the nitrogen to which they are attached to form an optionally substituted heterocycloalkyl;

each $R^6$ and $R^7$ are independently hydrogen, halogen, optionally substituted $C_1$-$C_6$ alkyl, optionally substituted $C_3$-$C_6$ cycloalkyl, —OR$^{10}$, —SR$^{10}$, or —NR$^4$N$^5$;

or $R^6$ and $R^7$ on the same carbon are taken together form an oxo, an optionally substituted oxime, an optionally substituted carbocycle, or optionally substituted heterocycle;

$R^{10}$ is hydrogen, optionally substituted $C_1$-$C_6$ alkyl, or optionally substituted $C_3$-$C_6$ cycloalkyl; and v is 1, 2, or 3;
made by a process comprising:
(a) reacting a compound of Formula (III):

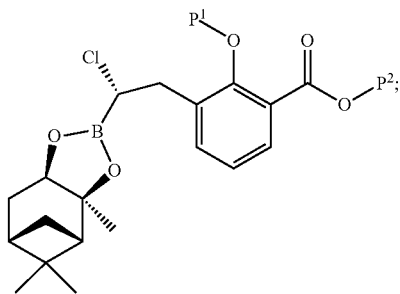

Formula (III)

wherein
$P^1$ is a hydroxyl protecting group; and
$P^2$ is a carboxyl protecting group;
with a protected ammonium reagent to form a compound of Formula (VI):

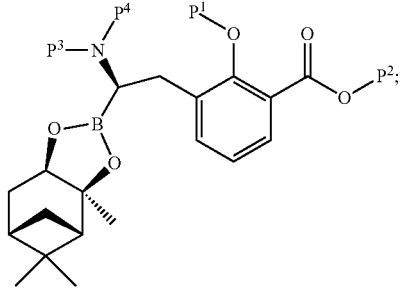

Formula (VI)

wherein $P^3$ and $P^4$ are amine protecting groups;

(b) reacting a compound of Formula (VI) with a compound of Formula (VII):

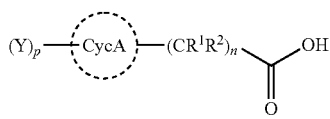
Formula (VII)

to form a compound of Formula (VIII):

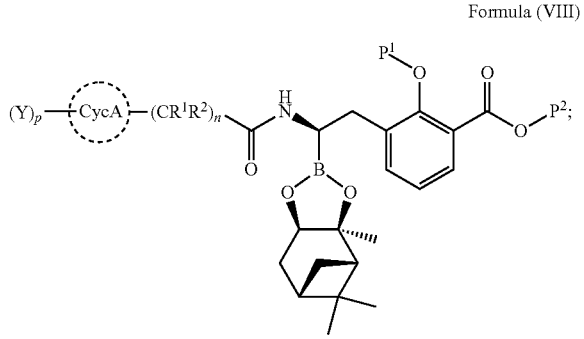
Formula (VIII)

(c) treating the compound of Formula (VIII) with an acid to obtain the compound of Formula (A).

In some embodiments, the protected ammonium reagent is a metal salt of hexaalkyldisilazane. In some embodiments, $P^3$ and $P^4$ are trimethylsilyl. In some embodiments, n is 1 or 2. In some embodiments, n is 1. In some embodiments, n is 2. In some embodiments, p is 1 or 2. In some embodiments, p is 1. In some embodiments, p is 2. In some embodiments, CycA is an optionally substituted cyclopentane or an optionally substituted cyclohexane. In some embodiments, CycA is an optionally substituted cyclopentane. In some embodiments, CycA is an optionally substituted cyclohexane. In some embodiments, CycA is cyclopentane. In some embodiments, CycA is cyclohexane. In some embodiments, each Y is independently —$NR^4R^5$ or —$NR^4(CR^6R^7)_vNR^4R^5$. In some embodiments, v is 2 or 3. In some embodiments, v is 2. In some embodiments, $R^1$ and $R^2$ are hydrogen. In some embodiments, $R^4$ and $R^5$ are independently hydrogen or optionally substituted heteroaryl. In some embodiments, $R^4$ and $R^5$ are hydrogen. In some embodiments, $R^6$ and $R^7$ are hydrogen. In some embodiments, $P^1$ is methyl. In some embodiments, $P^2$ is tert-butyl. In some embodiments, W and $P^4$ are trimethylsilyl.

In some embodiments, the process yields the compound of Formula (A) that is at least about 97% (mole %) pure.

In some embodiments, the process further comprises step (d) crystallizing the compound of Formula (A). In some embodiments, the compound of Formula (A) is crystalline. In some embodiments, the compound of Formula (A) is free of trifluoroacetic acid. In some embodiments, the compound of Formula (A) is more than about 98% pure (mole %).

Also disclosed herein is a process for making a compound of Formula (II) comprising treating a compound of Formula (I):

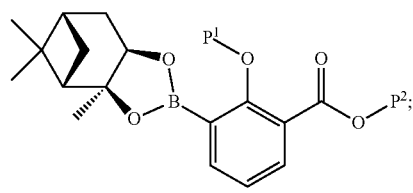
Formula (I)

wherein $P^1$ is a hydroxyl protecting group; and $P^2$ is a carboxyl protecting group with a dihalomethane in the presence of a Grignard reagent selected from isopropylmagnesium chloride, isobutylmagnesium chloride, isobutylmagnesium chloride:lithium chloride and isopropylmagnesium chloride:lithium chloride.

In some embodiments of a process for making a compound of Formula (II), the process further comprises maintaining the temperature between about −60° C. and about −20° C. In some embodiments of a process for making a compound of Formula (II), the hindered Grignard reagent is isopropylmagnesium chloride:lithium chloride. In some embodiments of a process for making a compound of Formula (II), the dihalomethane is chloroiodomethane. In some embodiments of a process for making a compound of Formula (II), $P^1$ is methyl. In some embodiments of a process for making a compound of Formula (II), $P^2$ is tert-butyl.

Also disclosed herein is a process for making a compound of Formula (III):

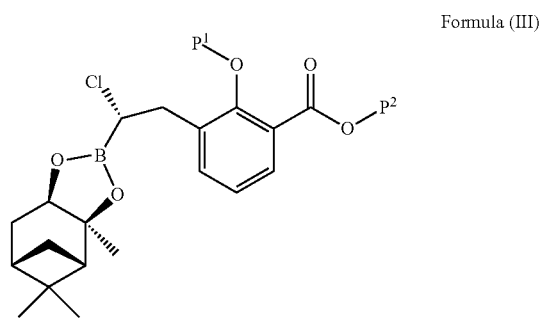
Formula (III)

wherein $P^1$ is a hydroxyl protecting group; and $P^2$ is a carboxyl protecting group;

comprising:

(a) contacting a solution of a compound of Formula (II) in a coordinating ethereal solvent with dichloromethyllithium at a temperature below −50° C. to generate a first reactive intermediate;

(b) exposing the first reactive intermediate to a Lewis acid in a coordinating ethereal solvent; and (c) warming the solution of step (b) to ambient temperature.

wherein the compound of Formula (II) has the structure:

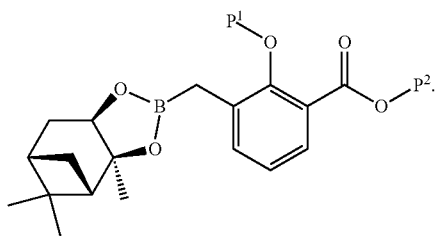

Formula (II)

In some embodiments of a process for making a compound of Formula (III), the dichloromethyllithium is generated from dichloromethane and lithium diisopropyl amide. In some embodiments of a process for making a compound of Formula (III), P' is methyl. In some embodiments of a process for making a compound of Formula (III), $P^2$ is tert-butyl. In some embodiments of a process for making a compound of Formula (III), the coordinating ethereal solvent is 2-methyltetrahydrofuran. In some embodiments of a process for making a compound of Formula (III), the Lewis acid is $ZnCl_2$. In some embodiments of a process for making a compound of Formula (III), the process further comprises performing an aqueous workup and extraction wherein the aqueous phase is pH 6 aqueous citric acid buffer.

EXAMPLES

All chemicals, reagents, and solvents were purchased from commercial sources when available and used without further purification.

The examples and embodiments described herein are for illustrative purposes only and in some embodiments, various modifications or changes are to be included within the purview of disclosure and scope of the appended claims.

Example 1: Synthesis of Compound 2

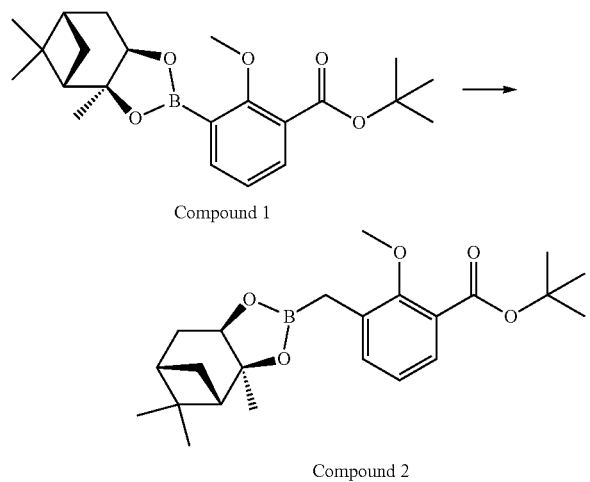

A 40 L cryogenic reactor was charged with a toluene/THF solution of Compound 1 (11.267 kg solution [45% w/w], 5.106 kg, 13.22 mol, 1.0 equiv.) followed by chloroiodomethane (3.491 kg, 19.79 mol, 1.5 equiv.) and THF (16 L, 3.1 vol). The dark solution was then cooled with liquid nitrogen cooling to an internal temperature (Ti) of −52° C. i-PrMgCl.LiCl (11.598 kg, 19.8% w/w in THF, 2.368 kg, 16.30 mol, 1.23 equiv.) and was added below the reaction surface over a time period of 34 min such that Ti stayed below −47° C. The conversion was checked by NMR (>99%). The sample for NMR analysis is obtained by transferring an aliquot of the reaction mixture to a suitable container and warming the resulting mixture to room temperature. Workup with aqueous ammonium chloride is followed by isolation of the product in the organic phase by evaporation of the solvent under reduced pressure. $^1$H NMR analysis comprises of relative integration of proton signal at 4.30 ppm (Compound 2) to proton signal 4.53 ppm (Compound 1) recorded in $d_6$-DMSO at 400 MHz) and the mixture was transferred into a 100 L reactor (precooled to −40° C.) and the cryo-reactor was rinsed with THF (4 L). The reaction mixture was then warmed up to 20° C. within 91 min and stirred at ambient temperature for additional 74 minutes before it was transferred into the addition vessel. The reactor was charged with sat. $NH_4Cl$ solution (26 L, 5 vol) and water (9 L, 1.7 vol). The reaction mixture was then added within 15 min such that the internal temperature stayed below 35° C. The phases were separated at Tj ("jacket temperature"): 30° C. and sat. aq. $NH_4Cl$ solution (35 L, 6.9 vol) was charged to the organic phase in the reactor. The phases were separated again at Tj of 30° C. and the organic phase (37 L) was concentrated under reduced pressure (Tj: 50° C., 255-203 mbar) to 2 vol (26 L distilled off). Then, toluene (25 L, 5 vol) was added to the mixture and distilled off again under reduced pressure (Tj: 50° C., 105-54 mbar). A 50 L glass pressure filter was charged with silica (6.0 kg, 1.2 wt, h: 12 cm) and wetted with toluene. The reaction mixture was diluted with toluene (25 L, 5 vol) and filtered over the silica plug. The reactor was rinsed with toluene (5 L, 1 vol) and this solution filtered over the silica plug as well. The plug was then flushed with toluene (50 L, 10 vol). The combined fractions (102 L) were concentrated under reduced pressure (Tj: 50° C., 55-45 mbar) to 1.3 vol (94 L distilled off) and Compound 2 was obtained as a brown solution (11.513 kg). The product (batch 1) was stored in a glass bottle and a sample was checked for purity by NMR. $^1$H NMR analysis comprises of relative integration of proton signal at 4.30 ppm (Compound 2) and proton signal 4.53 ppm (Compound 1) against an internal standard (typically maleic acid) recorded in $d_6$-DMSO at 400 MHz) The quality was found to be adequate and the batch was released for a final batch combination.

|  | Compound 1 | Compound 2 (solution) | Purity |
|---|---|---|---|
| Batch 1 | 11.267 kg |  |  |
| Batch 2 | 11.248 kg |  |  |
| Batches 1 + 2 |  | 9.57 kg (18.72 kg of 51% w/w, 23.92 mol). 91% ($^1$H NMR assay corrected) | $^1$H NMR assay: 51.15% w/w; HPLC purity: 89.28% a/a; KF: 0.019% w/w. |
| Batch 3 | 11.237 kg |  |  |
| Batch 4 | 3.759 kg |  |  |
| Batch 5 | 8.990 kg |  |  |
| Batches 3 + 4 + 5 |  | 14.22 kg (21.00 kg of 67.7% w/w, 23.92 mol). 90% ($^1$H NMR assay corrected) | $^1$H NMR assay: 67.73% w/w; HPLC purity: 91.73% a/a; KF: 0.016% w/w |

Example 2: Synthesis of Compound 3
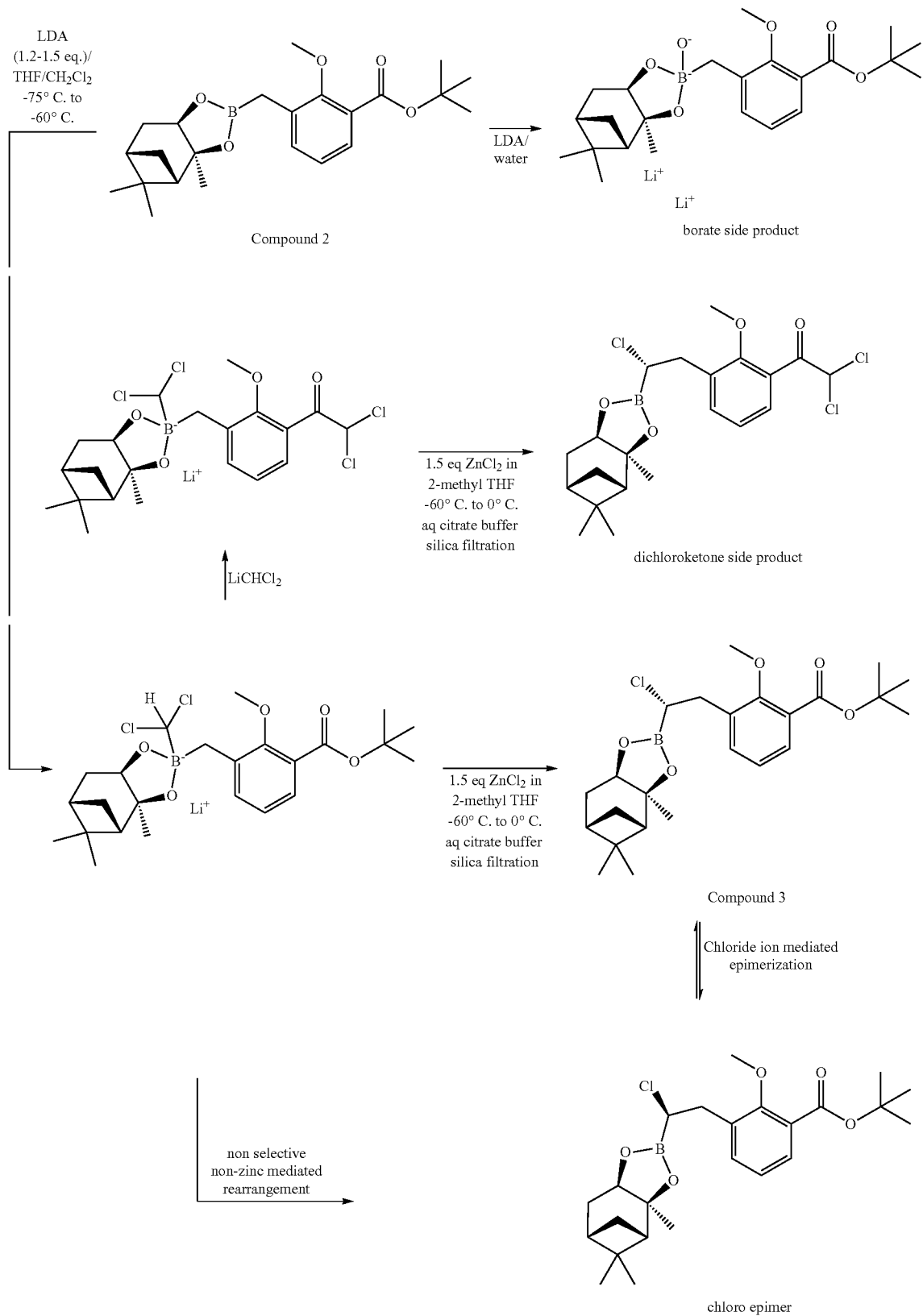

A 40 L cryogenic reactor was charged with Compound 2 (9.383 kg solution, 51% w/w, 4.799 kg, 11.99 mol, 1.0 equiv.) followed by dichloromethane (5 L, 1 vol) and 2-MeTHF (19 L, 4 vol). The dark solution was cooled with liquid nitrogen cooling to an internal temperature of −73° C. Lithium diisopropylamide (5.822 kg, 25% in THF/heptane, 1.747 kg, 16.31 mol, 1.36 equiv.) was added above surface over a time period of 95 min such that the internal temperature (Ti) stayed below −67° C. and the conversion was checked by $^1$H NMR (~81%). The sample for NMR analysis is obtained by transferring an aliquot of the reaction mixture to a solution containing excess zinc chloride in 2-Me THF at −40° C. and warming the resulting mixture to room temperature. Workup with aqueous citrate buffer is followed by isolation of the product in the organic phase by evaporation of the solvent under reduced pressure. $^1$H NMR analysis comprises of relative integration of the proton peak at 4.31 ppm (Compound 2) and the sum of the integration of protons at 4.38 ppm (chloro epimer) and 4.42 ppm (Compound 3+dichloroketone side product) recorded in $d_6$-acetone at 400 MHz. A second portion of lithium diisopropylamide (1.448 kg, 25% in THF/heptane, 0.434 kg, 4.05 mol, 0.34 equiv.) was added within 19 min such that Ti stayed below −74° C. and the conversion was checked again by $^1$H NMR (91%). In parallel a 100 L reactor was charged with $ZnCl_2$ in 2-MeTHF (13.0 kg solution. 25% w/w, 3.25 kg, 23.85 mmol, 2.00 equiv.) and cooled to −37° C. The reaction mixture from the cryo-reactor was transferred to the solution at an internal temperature of −37 to −45° C. and was warmed up to 20° C. within 69 min. After stirring for 31 min at ambient temperature an aqueous citric acid buffer (20% w/w, pH: 6, 44 L) was added at 20° C. within 20 min. The phases were separated and the organic phase (50 L) was concentrated under reduced pressure (Tj: 50° C., 204-101 mbar) to 2 vol (40 L distilled off). To the mixture was then added toluene (25 L, 5.2 vol) and distilled off again under reduced pressure (Tj: 50° C., 75-40 mbar). A 50 L glass pressure filter was charged with silica (6.9 kg, h: 12 cm) and wetted with toluene. The reaction mixture was diluted with toluene (19 L, 4 vol) and filtered over the silica plug. The reactor was rinsed with toluene (5 L, 1 vol) and this solution filtered over the silica plug as well. The plug was then flushed with toluene (50 L, 10 vol). The combined fractions (94 L) were concentrated under reduced pressure (Tj: 50° C., 63-40 mbar) to 1.3 vol (87 L distilled off) and the product was obtained as a brownish solution (9.445 kg).

The product (batch 1) was stored in a glass bottle and a sample was checked for purity by NMR. $^1$H NMR analysis comprises of relative integration of the proton peaks at 4.31 ppm (Compound 2) proton at 4.38 ppm (chloro epimer) proton at 4.42 ppm (Compound 3+dichloroketone side product) and proton at 7.58 (dichloroketone side product) against an internal standard (typically maleic acid) recorded in $d_6$-Acetone at 400 MHz. The quality was found to be adequate and the batch was released for a final batch combination.

|  | Compound 2 | Compound 3 | Purity |
|---|---|---|---|
| Batch 1 | 9.383 kg solution, 51% w/w, 4.799 kg | | |
| Batch 2 | 9.251 kg solution, 51% w/w, 4.732 kg | | |

-continued

|  | Compound 2 | Compound 3 | Purity |
|---|---|---|---|
| Batches 1 + 2 | | 8.687 kg (13.594 kg of 63.9% w/w, 19.36 mol). 81% ($^1$H NMR assay corrected) | $^1$H NMR assay: 63.9% w/w; KF: 0.01% w/w. Compound 2: 7.1% w/w. Dichloroketone: 3.6% w/w. Chloro epimer: 3.8% w/w. |
| Batch 3 | 7.381 kg solution, 68% w/w, 4.999 kg | 4.150 kg (5.759 kg of 72.1% w/w, 9.25 mol). 74% ($^1$H NMR assay corrected) | $^1$H NMR assay: 72.1% w/w; KF: 0.02% w/w. Compound 2: 7.5% w/w. Dichloroketone: 3.9% w/w. Chloro epimer: 4.1% w/w |
| Batch 4 | 6.870 kg solution, 68% w/w, 4.653 kg | | |
| Batch 5 | 6.738 kg solution, 51% w/w, 4.561 kg | | |
| Batches 4 + 5 | | 7.657 kg (11.277 kg of 67.9% w/w, 17.06 mol). 74% ($^1$H NMR assay corrected) | $^1$H NMR assay: 67.9% w/w; KF: 0.01% w/w. Compound 2: 10.2% w/w. Dichloroketone: 4.6% w/w. Chloro epimer: 3.3% w/w |

Example 3: Synthesis of Compound 3 (Using Flow Chemistry)

Several experiments were performed to optimize the flow chemistry parameters.

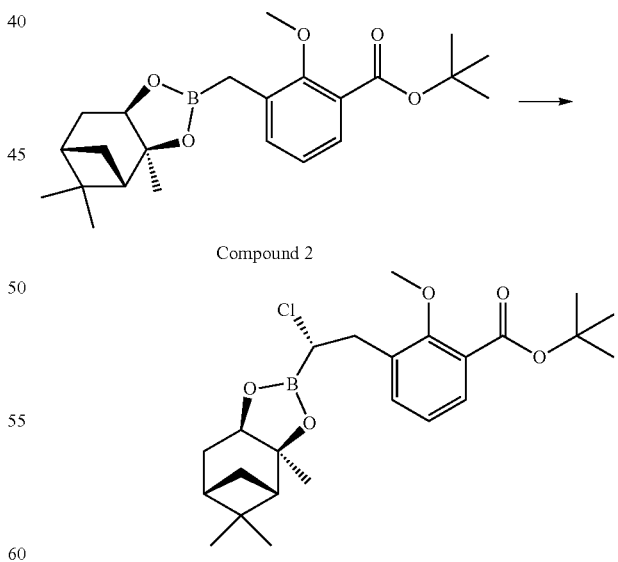

Compound 2

Compound 3

Example 3.1

Figure 2:
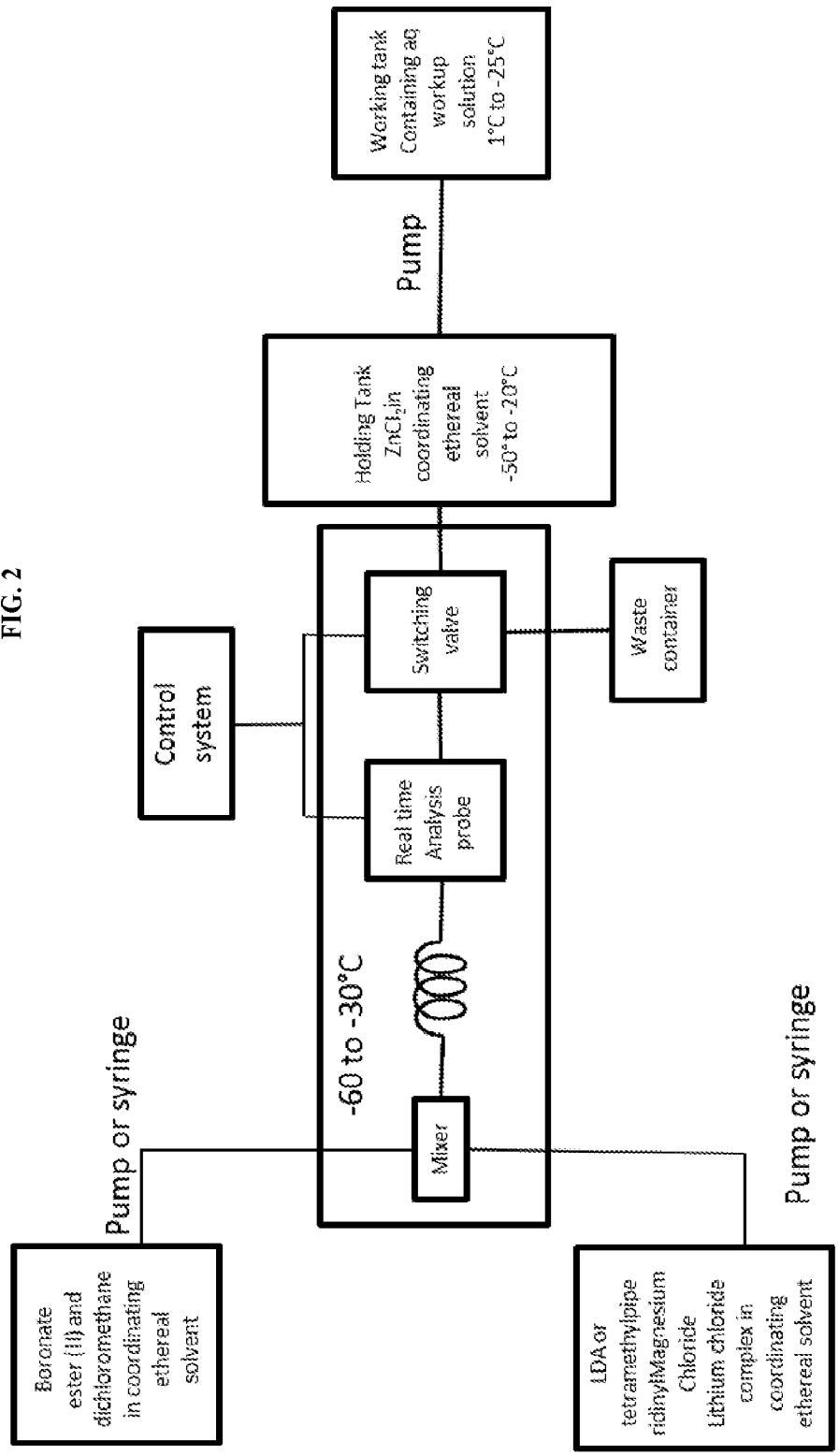
FIG. 2 shows the diagram for flow chemistry described herein further incorporating functionality to allow diverting of the forerun.

A solution of Compound 2 (70.24 g, dried by coevaporation with toluene) in dry DCM (35 ml) and dry Me-THF (175 ml) was mixed with a solution of about 12.5% LDA in Me-THF/heptane/ethyl benzene. The starting material solution was about 0.64 M and was pumped with a flow of 40 ml/min, the LDA solution was about 0.94 M and was pumped with a flow of 32 ml/min to achieve a stoichiometric ratio of about 1.15. Pumping was done with two HPLC piston pumps. The mixing was done in the apparatus diagrammed in FIG. 1 (an alternative system is shown in FIG. 2). The mixer and the coils were cooled in an ethanol-dry ice-bath at about −40° C. A conversion of about 49% was achieved. The reaction was also done at −50° C. A sample of the stream of the product solution was mixed with the same volume of zinc chloride solution in Me-THF and worked-up with a citric acid buffer. The conversion was 53%. It is assumed that in both cases pumping problems did lead to a lower flow of the LDA solution than calculated.

Example 3.2

A solution of Compound 2 (19.82 g, dried by coevaporation with toluene) in dry DCM (20 ml) and dry Me-THF (100 ml) was mixed with a solution of about 12.5% LDA in Me-THF/heptane/ethyl benzene. The starting material solution was about 0.33 M and was pumped with a flow of 50 ml/min, the LDA solution was about 0.90 M and was pumped with a flow of 20 ml/min to achieve a stoichiometric ratio of about 1.15. Pumping was done with two HPLC piston pumps. The mixing was done in the apparatus shown in FIG. 1 with an additional static mixer after the initial T-type-mixer. The mixer and the coils were cooled in an ethanol-dry ice-bath at about −50° C. A conversion of about 48% was achieved.

Example 3.3

A solution of Compound 2 (19.99 g, dried by coevaporation with toluene) in dry DCM (20 ml) and dry Me-THF (100 ml) was mixed with a solution of about 12.5% LDA in Me-THF/heptane/ethyl benzene. The starting material solution was about 0.33 M and was pumped with a flow of 50 ml/min, the LDA solution was about 0.90 M and was pumped with a formal flow of 30 ml/min to achieve a stoichiometric ratio of about 1.15. Pumping was done with one HPLC piston pump for the starting material and a micro gear pump for the LDA solution. The flow of the micro gear pump was formally higher than necessary as the flow is reduced by back-pressure. The mixing was done in the apparatus shown in FIG. 1. The mixer and the coils were cooled into an ethanol-dry ice-bath at about −50° C.
1: Formal flow 30 ml/min, conversion 82%
2: Formal flow 35 ml/min, conversion 90%
3: Formal flow 30 ml/min, conversion 97%.

Example 3.4

A solution of Compound 2 (20.05 g, dried by coevaporation with toluene) in dry DCM (20 ml) and dry Me-THF (100 ml) was mixed with a solution of about 12.5% LDA in Me-THF/heptane/ethyl benzene. The starting material solution was about 0.33 M and was pumped with a flow of 50 ml/min, the LDA solution was about 0.90 M and was pumped with a flow of 22 ml/min to achieve a stoichiometric ratio of about 1.15. Pumping was done with two HPLC piston pumps. The mixing was done in the apparatus shown in FIG. 1 with an additional small coil after the initial T-type mixer. The mixer and the coils were diving into an ethanol-dry ice-bath at about −50° C.
1: Some reaction mixture was quenched with zinc-chloride solution and stored at −20° C. No degradation of product due to prolonged storage after ZnCl$_2$ observed.
2: full work-up, conversion 95%.
3: LDA flow increased to 33 ml/min, starting material flow increased to 75 ml/min, conversion 89%.

Example 3.5

A solution of Compound 2 (1.01 g, dried by coevaporation with toluene) in dry DCM (1.0 ml) and dry Me-THF (5.0 ml) was mixed with a solution of about 12.5 LDA in Me-THF/heptane/ethyl benzene. The starting material solution was about 0.35 M and the LDA solution was about 0.85 M.
1: flow starting material 5 ml/min, LDA 2.3 ml/min, 50% conversion.
2: flow starting material 5 ml/min, LDA 1.5 ml/min, 60% conversion.

Example 3.6

A solution of Compound 2 (62.93 g, dried by coevaporation with toluene) in dry DCM (63 ml) and dry Me-THF (160 ml) was mixed with a solution of about 12.5% LDA in Me-THF/heptane/ethyl benzene. The starting material solution was about 0.58 M and was pumped with a flow of 50 ml/min, the LDA solution was about 0.86 M and was pumped with a flow of 22 ml/min to achieve a stoichiometric ratio of about 1.17. Pumping was done with two HPLC piston pumps. The mixing was done in the large apparatus with an additional small coil after the initial T-type mixer. The mixer and the coils were cooled in an ethanol-dry ice-bath.
1: −30° C. bath. Flow starting material: 40 ml/min, flow LDA: 28 ml/min. 85% conversion, less than 1% dichloroketone.
2: −30° C. bath. Flow starting material: 80 ml/min, flow LDA: 56 ml/min. 91% conversion, about 3% of dichloroketone.
3: −50° C. bath. Flow starting material: 40 ml/min, flow LDA: 28 ml/min. 93% conversion, about 3% of dichloroketone.
4: −50° C. bath. Flow starting material: 80 ml/min, flow LDA: 56 ml/min. 93% conversion, about 4% of dichloroketone.
5: −60° C. bath. Flow starting material: 40 ml/min, flow LDA: 28 ml/min. 84% conversion, less than 1% dichloroketone.
6: −60° C. bath. Flow starting material: 40 ml/min, flow LDA: 28 ml/min. 74% conversion, less than 1% dichloroketone (repetition of #5).
7: −60° C. bath. Flow starting material: 40 ml/min, flow LDA: 35 ml/min. 95% conversion, about 4% of dichloroketone.

Example 4: Optimized Synthesis of Compound 3
(Using Flow Chemistry)

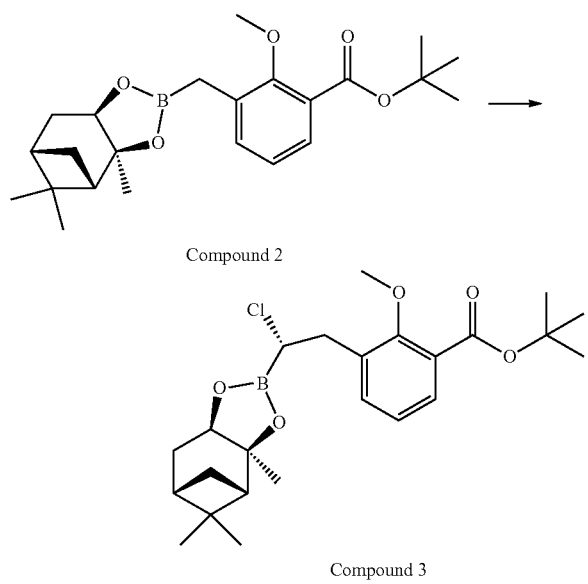

Compound 2

Compound 3

Figure 3:
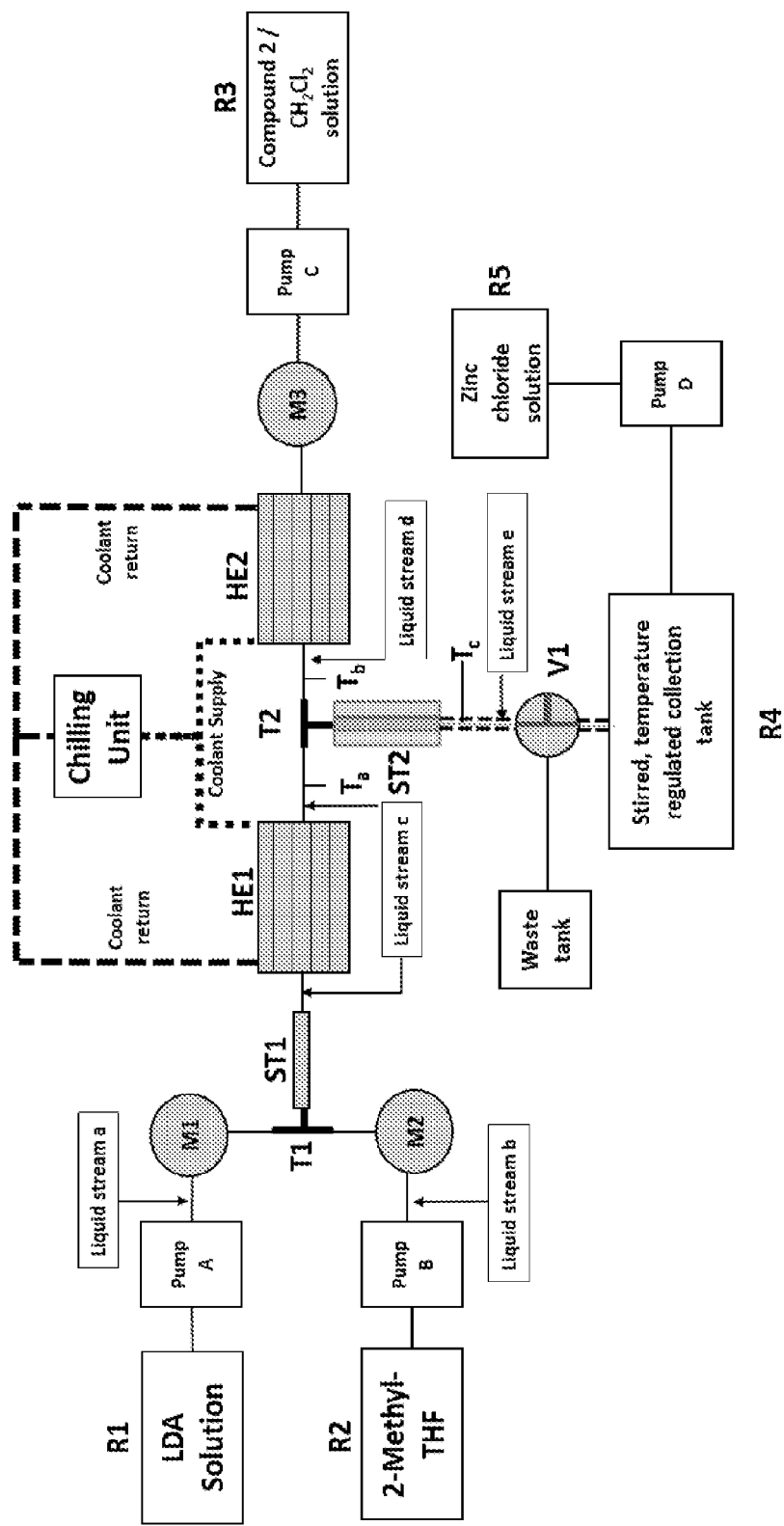
FIG. 3 shows the diagram for the optimized synthesis of Compound 3 from Compound 2.

General Reactor Setup Comprises (as Described in FIG. 3):
a. A pressurized reservoir (R1) containing commercial LDA solution in THF/ethyl benzene/heptane.
b. An appropriate liquid pump A or dosage valve with flow pulsation specification less than or equal to around 1.5% flow rate (mL/min).
c. A pressurized reservoir (R2) containing 2-methyl tetrahydrofuran.
d. An appropriate liquid pump B with flow pulsation specification less than or equal to around 1.5% flow rate.
e. An appropriate tubing T-joint (T1) to merge liquid stream a and liquid stream b.
f. A mass flow meter (M1) in line between liquid pump A and T-joint T1.
g. A mass flow meter (M2) in line between liquid pump B and T-joint T1.
h. An appropriate static mixer (ST1) to effect thorough mixing of liquid stream a and liquid stream b to produce liquid stream c of diluted LDA.
i. An appropriate heat exchange unit (HE1) between static mixer ST1 and T-joint T2.
j. A temperature sensor ($T_a$) between the exit line of heat exchange unit 1 and T-joint T2.
k. A pressurized reservoir (R3) containing compound 2 and dichloromethane in 2-methyl tetrahydrofuran/toluene.
l. An appropriate liquid pump C with flow pulsation specification less than or equal to around 1.5% flow rate.
m. A mass flow meter M3 in line between pump C and heat exchange unit 2.
n. An appropriate heat exchange unit (HE2) between mass flow meter M3 and T-joint T2.
o. An appropriate static mixer (ST2) housed in a thermally insulated jacket.
p. An appropriate tubing T-joint (T2) to merge liquid stream c and liquid stream d.
q. A temperature sensor ($T_b$) between the exit line of HE2 and T-joint T2.
r. A temperature sensor ($T_a$) on the exit line of static mixer ST2.
s. A collection tank (R4) fitted with a stirrer and cooling jacket and at least 2 inlet ports.
t. A reservoir (R5) of zinc chloride in 2 methyl-tetrahydrofuran.
u. An appropriate pump D or gravity assisted addition unit for transfer of zinc chloride solution from R5 to collection tank R4.
v. An appropriate thermally insulated tubing line to carry liquid stream e between ST2 and collection tank R4.
w. A three way valve (V1) between ST2, collection tank R4 and waste tank
x. An appropriate coolant chilling unit with output lines connected to HE1 and HE2 either in series or in parallel (diagram shows parallel arrangement)
y. Coolant return lines from HE1 and HE2 to chiller.
z. A data monitoring/control unit Flow Reactor Operating Parameters
1. The concentration of LDA input solution was between about 1.0 and about 2.5 Molar.
2. 2-methyl-tetrahydrofuran was substantially dry with water content below about 0.08% w/w.
3. The dilution across ST1 produced an LDA solution of between about 0.5 and about 1.9 M in LDA.
4. Wetted surfaces were made of corrosion resistant materials such as, but not limited to, PTFE, glass, Hastelloy 276, or stainless steel SS316/SS316L. Connecting tubing between components of the flow reactor system were between 3 and 13 mm, preferably around 6 mm.
5. Input material containers were pressurized to between about 1 and about 30 psi
6. Pump speeds were controlled manually or through automation software based on mass flow meter data.
7. Absolute flow rates and tubing diameters were adjusted to provide a mixing time in ST2 of not more than about 200 ms.
8. The stoichiometric ratio of LDA to Compound 2 entering ST2, at steady state, was between about 1:1 and about 1.25:1.
9. Temperature $T_a$ was similar to temperature $T_b$. This was achieved by series connection of HE1 and HE2 to a chiller unit of sufficiently high capacity, by connection in parallel of a single chiller of sufficient capacity to HE1 and HE2, or by use of two independent chillers individually connected to HE1 and HE2 respectively.
10. $T_a$ and $T_b$ were between about −40° C. to about −10° C.
11. The temperature rise across ST2 ($\Delta T = T_c - T_a$) was typically around +20° C.
12. The stoichiometric ratio of dichloromethane to Compound 2 was between about 5:1 and about 7:1.
13. The input solution of compound 2 was between about 10% and about 20% w/w in Compound 2.
14. $ZnCl_2$ solution in holding tank R4 (about 1.9 M in 2-methyl tetrahydrofuran) was stirred at a temperature between −10° C. and +10° C. At the start of the steady state flow period, Holding tank R4 contained between about 10% and about 100% of the total required amount of $ZnCl_2$ (1-2 molar equivalents relative to Compound 2). In the case where less than 100% of the required $ZnCl_2$ was in the holding tank at the start of the steady state period, additional $ZnCl_2$ solution was added at a rate sufficient to maintain at least 1 molar equivalent relative to the amount of Compound 2 removed from input tank R3 at that time.

General Procedure (1) ST2 was pre-calibrated to determine mixing time as a function of flow rate. This provides the minimum flow rate ($F_{T(min)}$) consistent with a mixing time of less than about 200 ms.

(2) Three way valve V1 was set to direct liquid stream e to waste.

(3) The chilling unit was cooled to an appropriate set point.

(4) At least 10% of the total required Zinc Chloride was charged to R4 from R5. The cooling jacket on R4 was set to, for example, 0° C.

(5) Pumps A, B, and C were engaged where:

Flow rate at pumps A, B, and C are adjusted to satisfy the following relationships.

$$(M1 \times C_{R1}) \times 1.1 / MWt_{(LDA)} = (M3 \times C_{R3}) / MWt_{(Compnd\ 2)}$$

$$1.5 \times F_A \geq F_B \geq 0.6 \times F_A$$

$$F_A + F_B + F_C \geq F_{T(min)}$$

where:

$F_A$ is the flow rate at Pump A
$F_B$ is the flow rate at Pump B
$F_C$ is the flow rate at Pump C
M1 is the mass flow reading at mass flow meter M1
M2 is the mass flow reading at mass flow meter M2
M3 is the mass flow reading at mass flow meter M3
$C_{R1}$=Fractional proportion of LDA in the commercial LDA solution in reservoir R1 expressed as wt/wt
$C_{R2}$=Fractional proportion of Compound 2 in the compound 2/dichloromethane/2-methyl tetrahydrofuran/toluene solution in reservoir R3 expressed as wt/wt.
$MWt_{(LDA)}$=Molecular weight of LDA (107.1).
$MWt_{(Compnd\ 1)}$=Molecular weight of Compound 2 (400.3).

(6) The coolant flow and temperature through HT1 and HT2 was adjusted to ensure $T_a \sim T_b$.

(7) $F_A$, $F_B$, and $F_C$ were fine-tuned, consistent with the conditions in step (5), to ensure $T_c - T_a = +20°$ C.

(8) Pump D was engaged and the flow rate of $ZnCl_2$ solution ($F_D$) between R5 and R4 adjusted such that $$N \times (M3 \times C_{R3}) / MWt_{(Compnd\ 1)} \leq C_{(ZnCl2)} \times F_D$$

where:

N is between 1.0 and 2.0
$C_{(ZnCl2)}$ is the concentration of $ZnCl_2$ in 2-methyl tetrahydrofuran in reservoir R5.
$F_D$ is the flow rate at pump D (9) Three way valve V1 was set to connect liquid stream e to holding tank R4.

(10) On complete consumption of the limiting reagent, the flow reactor system was shut down and the solution in holding tank R4 was warmed to room temperature and worked up as described in Example 2 except filtration through the silica gel plug was omitted.

Representative data using this general reactor setup are shown in Table 1 and 2.

TABLE 1

| Total Flow Rate ($F_A + F_B + F_C$) (mL/min) | Throughput Compd 2 (Kg/hr) | Molar Equiv. LDA: Compd 2 | Ta (° C.) | Yield (%) |
|---|---|---|---|---|
| 143 | 1.05 | 1.1 | −32 to −36 | 93 |

TABLE 2

| Conversion Compd 3: Compnd 2 | Diastereoselection Compnd 3: Chloro epimer | Selectivity Compd 3: Dichloroketone side product |
|---|---|---|
| 98:2 | 98:2 | >98:2 |

Example 5: Optimized Synthesis of Compound 2 (Using Flow Chemistry)

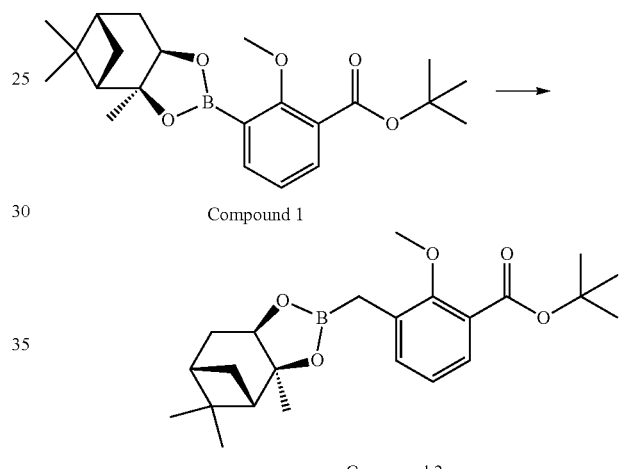

Compound 1

Compound 2

Figure 4:
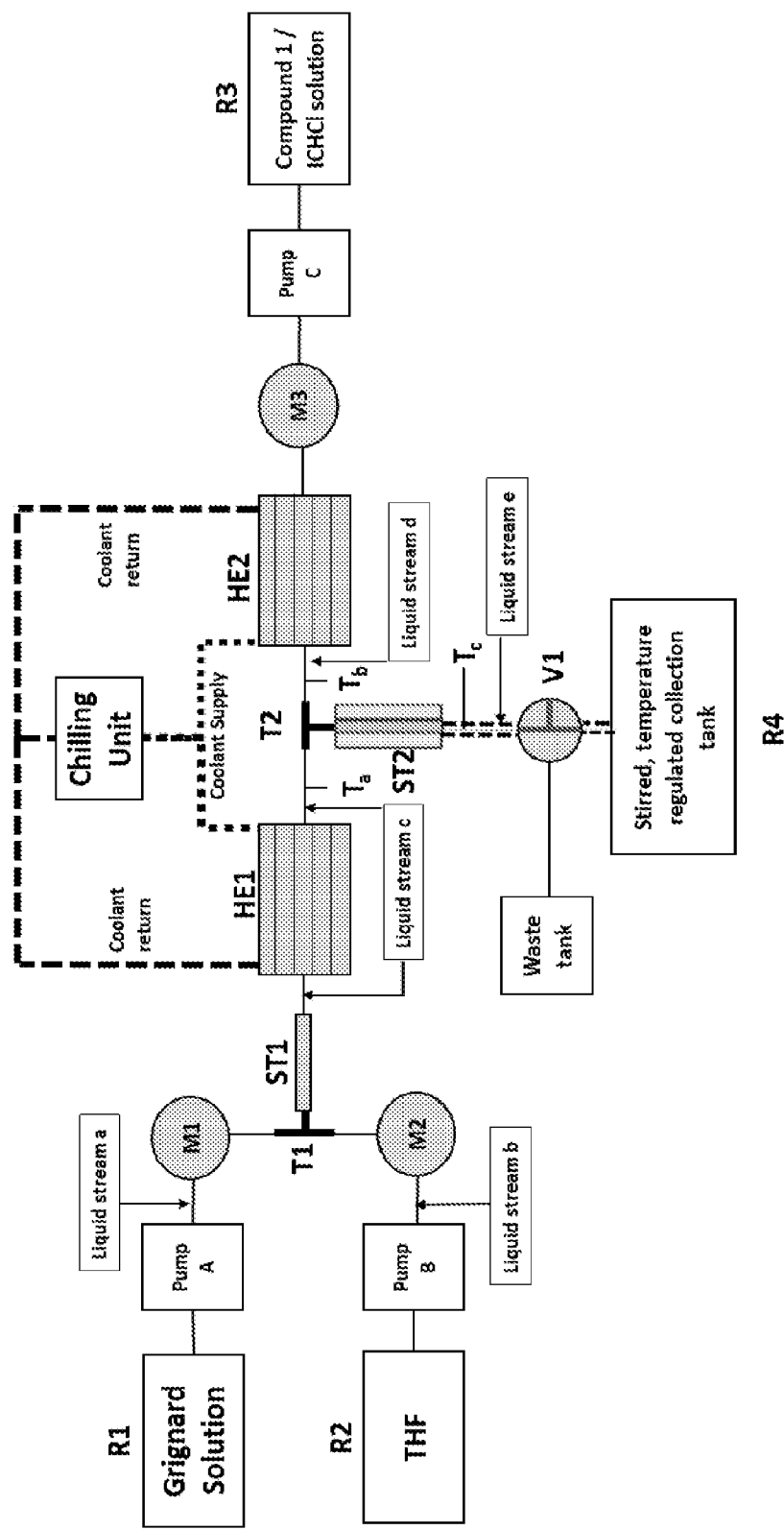
FIG. 4 shows the diagram for the optimized synthesis of Compound 2 from Compound 1.

General Reactor Setup Comprises (as Described in FIG. 4):

(a) A pressurized reservoir (R1) containing commercial isopropylmagnesium chloride:Lithium chloride complex in THF.

(b) An appropriate liquid pump A (or dosage valve) with flow pulsation specification less than or equal to around 1.5% flow rate.

(c) An appropriate static mixer ST1 to effect thorough mixing of liquid stream a and liquid stream b to produce liquid stream c.

(d) A pressurized reservoir (R2) containing tetrahydrofuran.

(e) An appropriate liquid pump B with flow pulsation specification less than or equal to around 1.5% flow rate.

(f) An appropriate tubing T-joint (T1) to merge liquid stream a and liquid stream b.

(g) A mass flow meter (M1) in line between liquid pump A and T-joint T1.

(h) A mass flow meter (M2) in line between pump B and T-joint T1.

(i) An appropriate heat exchange unit (HE1) between static mixer ST1 and T-joint T2.

(j) A pressurized reservoir (R3) containing compound 1 and chloroiodomethane in tetrahydrofuran.

(k) An appropriate liquid pump C with flow pulsation specification less than or equal to around 1.5% flow rate.
(l) A mass flow meter M3 in line between pump C and heat exchange unit 2.
(m) An appropriate heat exchange unit (HE2) between mass flow meter 3 and T-joint T2.
(n) A temperature sensor ($T_a$) between the exit line of heat exchange unit 1 and T-joint T2.
(o) A temperature sensor ($T_b$) between the exit line of HE2 and T-joint T2.
(p) An appropriate tubing T-joint (T2) to merge liquid stream c and liquid stream d.
(q) An appropriate static mixer ST2 housed in a thermally insulated jacket.
(r) A temperature sensor ($T_c$) on the exit line of static mixer ST2.
(s) A collection tank (R4) fitted with a stirrer and cooling jacket and at least 2 inlet ports.
(t) An appropriate thermally insulated tubing line to carry liquid stream e between ST2 and collection tank R4.
(u) A three way valve (V1) between ST2, collection tank R4 and a waste tank
(v) An appropriate coolant chilling unit with output lines connected to HE1 and HE2 either in series or in parallel
(w) Coolant return lines from HE1 and HE2 to chiller.
(x) A data monitoring/control unit Flow Reactor Operating Parameters for the Conversion of Compound 1 to Compound 2.
(1) The concentration of isopropylmagnesium chloride lithium chloride input solution was between about 1.1 and about 1.5 Molar.
(2) Tetrahydrofuran was substantially dry with water content below about 0.08% w/w.
(3) The dilution across ST1 produced an isopropylmagnesium chloride lithium chloride solution of between about 0.5 and about 1.9 M in isopropylmagnesium chloride lithium chloride.
(4) Wetted surfaces were made of corrosion resistant materials such as, but not limited to, PTFE, glass, Hastelloy 276 or stainless steel SS316/SS316L. Connecting tubing between components of the flow reactor system were between 3 and 13 mm.
(5) Input material containers were pressurized to 1-30 psi
(6) Pump speeds were controlled manually or through automation software based on mass flow meter data.
(7) Absolute flow rates and tubing diameters were adjusted to provide a mixing time in ST2 of not more than about 1 second.
(8) The stoichiometric ratio of isopropylmagnesium chloride lithium chloride complex to compound 1 entering ST2, at steady state, was between about 1:1 and about 1.5:1.
(9) Temperature $T_a$ is similar to temperature $T_b$. This was achieved by series connection of HE1 and HE2 to a chiller unit of sufficiently high capacity, by connection in parallel of a single chiller of sufficient capacity to HE1 and HE2 or by use of two independent chillers individually connected to HE1 and HE2 respectively.
(10) $T_a$ and $T_b$ were set in the range about −40° C. to about 0° C.
(11) The stoichiometric ratio of chloroiodomethane to compound 1 in reservoir R3 was between about 1:1 and about 1.5:1.
(12) The input solution of compound 1 was between about 10% and about 20% w/w in compound 1.

General Procedure
(1) ST2 was pre-calibrated to determine mixing time as a function of flow rate. This provides the minimum flow rate ($F_{T(min)}$) consistent with a mixing time of <1 second.
(2) Three way valve V1 was set to direct liquid stream e to waste.
(3) The chilling unit was cooled to an appropriate set point.
(4) Pumps A, B, and C were engaged where:
Flow rate at pumps A, B, and C were adjusted to satisfy the following relationships.

$$(M1 \times C_{R1}) \times 1.1 / MWt_{(Grig)} = (M3 \times C_{R3}) / MWt_{(Compnd\ 1)}$$

$$1.5 \times F_A \geq F_B \geq 0.6 \times F_A$$

$$F_A + F_B + F_C > F_{T(min)}$$

where:
$F_A$ is the flow rate at Pump A
$F_B$ is the flow rate at Pump B
$F_C$ is the flow rate at Pump C
M1 is the mass flow reading at mass flow meter M1
M2 is the mass flow reading at mass flow meter M2
M3 is the mass flow reading at mass flow meter M3
$C_{R1}$=Fractional proportion of isopropylmagnesium chloride in the commercial isopropylmagnesium chloride lithium chloride complex solution in reservoir R1 expressed as wt/wt
$C_{R2}$=Fractional proportion of Compound 1 in the compound 1/chloroiodomethane/tetrahydrofuran solution in reservoir R3 expressed as wt/wt.
$MWt_{(Grig)}$=Molecular weight of isopropylmagnesium chloride (102.8).
$MWt_{(Compnd\ 1)}$=Molecular weight of Compound 1 (386.3).
(5) The coolant flow and temperature through HT1 and HT2 were adjusted to ensure $T_a \sim T_b$ and this temperature is around −30° C.
(6) Three way valve V1 was set to holding tank R4.
(7) On complete consumption of the limiting reagent, the flow reactor system was shut down and the solution in holding tank R4 was warmed to room temperature until starting material was consumed then worked up as described in Example 1 except the saturated ammonium chloride solution (5 volumes) in Example 1 was replaced by acetic acid/sodium acetate buffer (15/85 molar ratio, total acetate 2M, approximately pH 5.5, 5 volumes) for the reaction quench. The organic solution was further washed with half saturated aqueous sodium chloride solution (5 volumes) in place of saturated ammonium chloride solution (6.9 volumes). The silica gel plug filtration was omitted.
(8) Representative data from using this general reactor setup is shown in Table 3 and Table 4

TABLE 3

| Total Flow Rate ($F_A + F_B + F_C$) (mL/min) | Throughput Compd 1 (Kg/hr) | Molar Equiv. Grig: Compd 1 | Ta (° C.) |
|---|---|---|---|
| 7 | 0.1 | 1.2 | −30 |

TABLE 4

| Yield (%) | Conversion (Compd 2: Compd 1) |
|---|---|
| 99 | >99 |

Example 6: (R)-2-hydroxy-3-(2-(trans-4-(2-(pyridin-2-ylamino)ethylamino)cyclohexyl) acetamido)-3,4-dihydro-2H-benzo[e][1,2]oxaborinine-8-carboxylic Acid

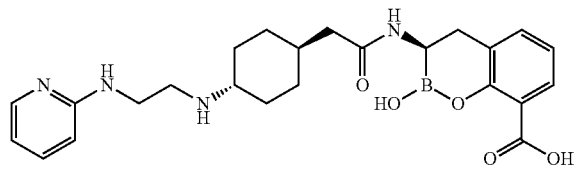 [SMILES: O=C(C[C@H]1CC[C@H](NCCNc2ccccn2)CC1)N[C@H]1Cc2cccc(C(=O)O)c2OB1O]

Step 1: Synthesis of ethyl 2-[4-[2-(2-pyridylamino)ethylamino]cyclohexyl]acetate

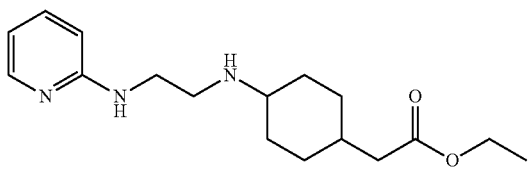 [SMILES: CCOC(=O)CC1CCC(NCCNc2ccccn2)CC1]

To a mixture of 2-(N-[2-(amino)-ethyl]-amino)-pyridine (685 mg, 5 mmol) and ethyl 2-(4-oxocyclohexyl)acetate (786 mg, 4 mmol) was added dichloromethane (4 mL) followed by titanium ethoxide (420 μL, 2 mmol, technical grade). The resulting mixture was stirred for 4 hr then concentrated under reduced pressure. The residue was taken up in methanol (10 mL) and cooled to −78° C. To this solution was added sodium borohydride (228 mg, 6 mmol). On complete addition, the cold bath was removed and stirring continued for 1.25 hr. The mixture was diluted with dichloromethane and poured into saturated sodium carbonate solution (15 mL). The organic phase was separated, dried over magnesium sulfate and concentrated to give the crude title compound as a 6:1 mixture trans:cis isomers. This mixture was used without further purification.

Step 2: Synthesis of ethyl 2-[4-[tert-butoxycarbonyl-[2-[tert-butoxycarbonyl(2-pyridyl)amino]ethyl]amino]cyclohexyl]acetate

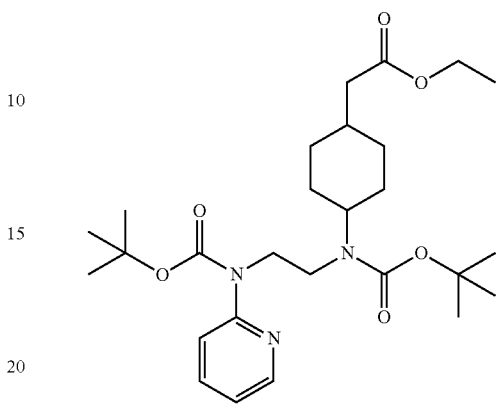

To a solution of ethyl 2-[4-[2-(2-pyridylamino)ethyl-amino]cyclohexyl]acetate (1.31 g, 4 mmol) in dichloromethane (12 mL) was added di-tert-butyl-dicarbonate (2.18 g, 10 mmol) followed by diisopropylethylamine (1.76 mL, 10 mmol). The resulting solution was stirred for 4 hr, diluted with ethyl acetate, washed with and brine, dried over magnesium sulfate and concentrated. The residue was purified by silica chromatography (30 g silica; eluted with 20% ethyl acetate/10% dichloromethane in hexanes) to give the title compound as a 6:1 mixture of trans:cis isomers.

Step 3: Synthesis of 2-[4-[tert-butoxycarbonyl-[2-[tert-butoxycarbonyl(2-pyridyl)amino]ethyl]amino]cyclohexyl]acetic Acid

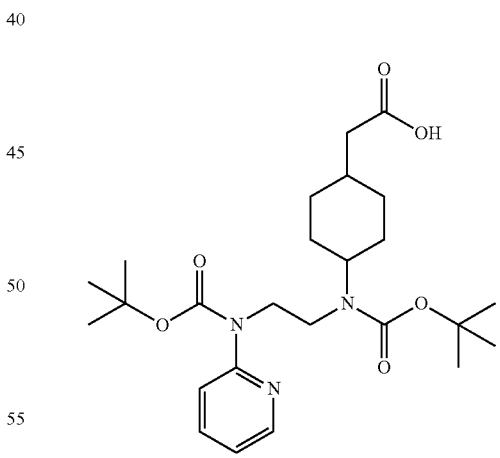

To a solution of ethyl 2-[4-[tert-butoxycarbonyl-[2-[tert-butoxycarbonyl(2-pyridyl)amino]ethyl]amino]cyclohexyl] acetate (968 mg, 1.91 mmol) in THF (3 mL); methanol (3 mL) and water (6 mL) was added lithium hydroxide monohydrate (397 mg, 9.7 mmol). The resulting solution was stirred for 2.25 hr, then acidified to pH 3 with 1 N HCl. The resulting mixture was extracted with dichloromethane (4 times). The combined organic extract was dried over magnesium sulfate and concentrated. The residue was purified by silica chromatography (10 g silica; eluted with 40-100% ethyl acetate in hexanes) to give the title compound as a 6:1 mixture of trans:cis isomers.

Step 4: Synthesis of Tert-Butyl 2-methoxy-3-((2R)-2-(2-(trans-4-(2-(pyridin-2-ylamino)ethylamino)cyclohexyl)acetamido)-2-(2,9,9-trimethyl-3,5-dioxa-4-bora-tricyclo[6.1.1.0²,⁶]dec-4-yl)ethyl)benzoate

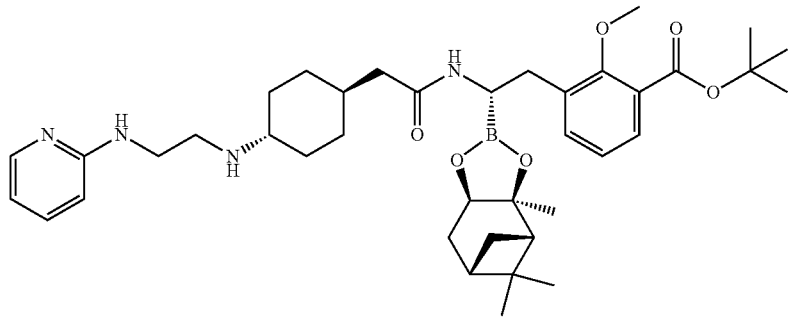 [SMILES: COc1c(C[C@@H](NC(=O)C[C@H]2CC[C@H](NCCNc3ccccn3)CC2)B2O[C@@H]3C[C@@H]4C[C@@H](C4(C)C)[C@]3(C)O2)cccc1C(=O)OC(C)(C)C]

To a cooled (−78° C.) solution of [(1S)-2-(3-tert-butoxycarbonyl-2-methoxy-phenyl)-1-chloro-ethyl]boronic acid (+) pinanediolato diester (Compound 3) (1.35 g, 3 mmol) in THF (9 mL) was added dropwise a solution of lithium bistrimethylsilylamide (3.0 mL, 1M in THF, 3 mmol). On complete addition, the cold bath was removed and stirring continued for 16.75 hours. The resulting solution, which was approximately 0.25M benzoic acid, 3-[(2R)-2-[bis(trimethylsilyl)amino]-2-[(3aS,4S,6S,7aR)-hexahydro-3a,5,5-trimethyl-4,6-methano-1,3,2-benzodioxaborol-2-yl]ethyl]-2-methoxy, 1,1-dimethylethyl ester in THF was used without further purification.

In a separate flask, to a mixture of 2-[4-[tert-butoxycarbonyl-[2-[tert-butoxycarbonyl(2-pyridyl)amino]ethyl]amino]cyclohexyl]acetic acid (477 mg, 1 mmol) and HATU (418 mg, 1.1 mmol) was added DMA (3 mL) followed by N-methyl-morpholine (120 µL, 1.1 mmol). The resulting solution was stirred for 90 minutes. To this solution was added a solution of Benzoic acid, 3-[(2R)-2-[bis(trimethylsilyl)amino]-2-[(3aS,4S,6S,7aR)-hexahydro-3a,5,5-trimethyl-4,6-methano-1,3,2-benzodioxaborol-2-yl]ethyl]-2-methoxy, 1,1-dimethylethyl ester (4 mL, 0.25M in THF 1 mmol). The resulting mixture was stirred for 2.5 hours, diluted with ethyl acetate washed with water and brine, dried over magnesium sulfate and concentrated. The residue was purified by silica chromatography (10 g silica; eluted with 20-100% ethyl acetate in hexanes) to give the title compound.

Step 5: Synthesis of (R)-2-hydroxy-3-(2-(trans-4-(2-(pyridin-2-ylamino)ethylamino)cyclohexyl) acetamido)-3,4-dihydro-2H-benzo[e][1,2]oxaborinine-8-carboxylic Acid

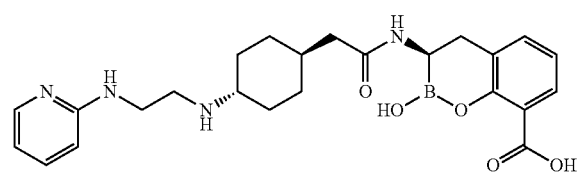 [SMILES: O=C(C[C@H]1CC[C@H](NCCNc2ccccn2)CC1)N[C@H]1Cc2cccc(C(=O)O)c2OB1O]

To a solution of tert-butyl 2-methoxy-3-((2R)-2-(2-(trans-4-(2-(pyridin-2-ylamino)ethylamino)cyclohexyl)acetamido)-2-(2,9,9-trimethyl-3,5-dioxa-4-bora-tricyclo[6.1.1.0²,⁶]dec-4-yl)ethyl)benzoate (396 mg, 0.45 mmol) in 1,4-dioxane (6 mL) was added HCl (6 ml, 3M in water). The resulting solution was heated to reflux and stirred at this temperature for 3.5 hours. The resulting mixture was cooled to room temperature and extracted with ether (2×). The remaining aqueous solution was purified directly by reverse phase HPLC Phenomenex Luna C18 column 35×75 mm; flow rate 40 mL/min; eluted with 5-70% CH$_3$CN in H$_2$O/ 0.1% TFA over 8 minutes. The title compound was isolated as the TFA salt by lyophilization.

What is claimed is:

1. A compound of Formula (A), or a pharmaceutically acceptable salt, solvate, or stereoisomer thereof:

Formula (A)

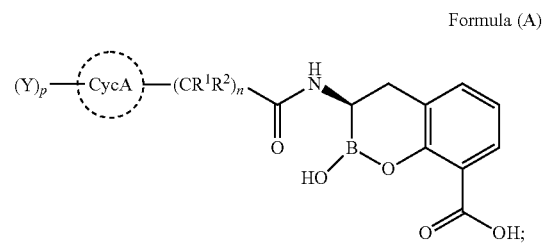

wherein
n is 1 or 2;
p is 1;
CycA is an optionally substituted cyclohexane;
each Y is independently —NR$^4$R$^5$ or —NR$^4$(CR$^6$R$^7$)$_v$NR$^4$R$^5$;
each R$^1$ and R$^2$ are hydrogen;
R$^4$ and R$^5$ are hydrogen;
each R$^6$ and R$^7$ are hydrogen; and
v is 2 or 3;
wherein the compound of Formula (A) is free of trifluoroacetic acid and is more than about 97% pure (mole %).

* * * * *